United States Patent
Govindassamy

(10) Patent No.: US 10,194,366 B1
(45) Date of Patent: Jan. 29, 2019

(54) METHOD AND APPARATUS FOR COLLABORATIVE MEASUREMENT INFORMATION RECEPTION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 175 days.

(21) Appl. No.: 15/383,643

(22) Filed: Dec. 19, 2016

(51) Int. Cl.
| | |
|---|---|
| H04W 36/30 | (2009.01) |
| H04W 36/00 | (2009.01) |
| H04B 17/318 | (2015.01) |
| H04W 76/14 | (2018.01) |
| H04W 84/04 | (2009.01) |
| H04W 84/12 | (2009.01) |
| H04W 88/04 | (2009.01) |

(52) U.S. Cl.
CPC .......... *H04W 36/30* (2013.01); *H04B 17/318* (2015.01); *H04W 36/0061* (2013.01); *H04W 36/0072* (2013.01); *H04W 76/14* (2018.02); *H04W 84/042* (2013.01); *H04W 84/12* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 8,806,530 B1 * | 8/2014 | Izdepski | H04N 21/258 725/141 |
| 9,942,871 B2 | 4/2018 | Lee et al. | |
| 2010/0167719 A1 * | 7/2010 | Sun | H04W 36/0088 455/423 |
| 2013/0309971 A1 | 11/2013 | Kiukkonen et al. | |
| 2015/0208457 A1 * | 7/2015 | Thanayankizil | H04W 76/15 370/329 |
| 2016/0037342 A1 | 2/2016 | Nomura | |

(Continued)

OTHER PUBLICATIONS

U.S. Appl. No. 15/296,571, filed Oct. 18, 2016. Title: Method and Apparatus for Paging Information Transmission.

(Continued)

*Primary Examiner* — Adnan Baig
(74) *Attorney, Agent, or Firm* — Lerner, David, Littenberg, Krumholz & Mentlik, LLP

(57) ABSTRACT

As the variety and number of wireless client devices have increased, often there may be multiple client devices in close proximity of each other. In addition to the connectivity to the wireless wide area network (WWAN), the client devices may have a short range link to directly connect with each other. Two or more client devices in a given area may be camped on the same or neighboring cells of the same WWAN, and the client devices may be performing measurements on the same set or subset of cells. A method and apparatus are disclosed such that a client device may perform serving and neighbor cells measurements and relay the measurements information to other client devices over the short range link. This may enable other client devices to avoid having to perform measurements directly on the WWAN cells which may reduce their power consumption.

31 Claims, 14 Drawing Sheets

(56) References Cited

U.S. PATENT DOCUMENTS

2016/0127855 A1  5/2016  Zhang et al.
2017/0208564 A1  7/2017  Lee et al.

OTHER PUBLICATIONS

U.S. Appl. No. 15/233,488, filed Aug. 10, 2016. Title: Method and Apparatus for Broadcast Information Transmission.
U.S. Appl. No. 15/290,644, filed Oct. 11, 2016. Title: Method and Apparatus for Measurements Information Transmission.

* cited by examiner

METHOD AND APPARATUS FOR COLLABORATIVE MEASUREMENT INFORMATION RECEPTION

CROSS REFERENCE TO RELATED APPLICATIONS

This application is related to U.S. patent application Ser. No. 15/290,664 filed Oct. 11, 2016, U.S. patent application Ser. No. 15/296,571 filed Oct. 18, 2016, and U.S. patent application Ser. No. 15/233,488 filed Aug. 10, 2016, and U.S. patent application Ser. No. 15/383,450, filed Dec. 19, 2016, the disclosures of which are hereby incorporated herein by reference.

BACKGROUND

A client device as defined in the present disclosure is a device that may access voice, video, text, instant messaging, internet and other services from a wireless communication network. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for mobile networks. Typically, as shown in FIG. 1, a WWAN comprises elements such as client devices or mobile stations and one or more base stations. Other network devices may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular communication systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred to herein as a "message."

A base station to which a client device may be downlink synchronized and/or communicating with at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called as an intra-cell handover. The purpose of intra-cell handover may be that the new channel is better suited for communication than the previous channel within the same cell. Cell reselections or handovers amongst cells that use the same frequency are referred to herein as intra-frequency cell reselection or handover. Cell reselections or handovers amongst cells that use different frequencies are referred to herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive that information. Such information is herein referred to as "broadcast messages."

Typically in a wireless communication system a base station may group the system information and each group of system information may be transmitted as multiple broadcast messages and such broadcast messages are herein referred to as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred to herein as "change-mark" is generally included in the SI messages. A client device may store the change-mark of the SIs it has decoded. If the new SI is transmitted by a cell, it may increment the change-mark to enable the client terminal to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIBs. This alternating sequence of sleep and wake-up in idle mode is referred to herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but not limited to the tracking area identity (TAI), Public Land Mobile Network Identity (PLMN ID) which uniquely identifies a particular network operator, Closed Subscriber Group Identity (CSG ID), RAT types, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the TACs of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is shown in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred to herein as Tracking Area Update (TAU) procedure. With this method, a client device performs TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred to herein as Client Device Identity (CDI).

As long as a client device is in the same registration area, the client device may not perform network registration procedure again except that a periodic network registration update procedure may need to be performed even if the client device continues to move within the same registration area. If the client device moves to a cell which does not belong to the registration area in which the client device is registered, then the client device may perform network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and the paging cycle. The network may transmit a paging message addressed to a specific client device in its specific PO. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay. A single paging message received in a single PO may include multiple paging records to page multiple client devices. Different client devices may be identified within a paging message by using their respective unique identities in the paging records. For example, International Mobile Subscriber Identity (IMSI) may be used for the identity, or in case of 3GPP LTE wireless communication system, System Architecture Evolution (SAE)-Temporary Mobile Subscriber Identity (S-TMSI) may be used.

As the variety and number of client devices have increased, often there may be multiple client devices in close proximity of each other. For example, a number of smartphones, tablets, entertainment systems, gaming consoles, navigation systems, etc. with connectivity to the wireless communication network may be present in a home, an office, a car, etc. There may be a need for the client devices to communicate with other client devices that may be in their close proximity. Therefore, in addition to the connectivity to the wireless communication network, the client devices may have other short range wireless connectivity interfaces to directly connect with each other without relying on a WWAN. Examples of such Short Range Wireless Links (SRWL) may include Wireless Local Area Network (WLAN) commonly known as Wi-Fi, Bluetooth™, or some other local area wireless networking schemes. The SRWLs may operate in a one-to-one or one-to-many mode of communication. For example, the WLAN may operate in an infrastructure mode in which the client devices communicate through an Access Point (AP) that may serve as a bridge to other client devices and other network elements such as internet. The WLAN may also operate in an ad hoc mode in which the two client devices may communicate directly with each other in a peer-to-peer manner. In general the SRWL may use any one of the well known networking topologies such as point-to-point, bus, star, ring or circular, mesh, tree, hybrid, or daisy chain. An example of this scenario is illustrated in FIG. 3 which includes the WWAN 302 and the SRWL 304 between the client devices Smartphone 308 and Smartphone 310. The SRWL 304 has the coverage area 306. The two client devices Smartphone 308 and Smartphone 310 are connected to the WWAN and directly with each other over the SRWL. The client device Smartphone 312 is connected to the WWAN but it is outside the coverage area of the SRWL.

Two or more client devices in a given area may be camped on the same or neighboring cell of the same WWAN, and both the client devices may be performing serving and neighbor cell measurements. This may be an inefficient method of measurements since most of the client devices which are connected on the same SRWL may be camped on the same or neighboring cell of the same WWAN.

SUMMARY

A method and apparatus are disclosed that enable one or more client devices to perform the measurements on the serving and neighbor cells of the WWAN and relay the serving and neighbor cells measurements information to the other client devices on the SRWL. This may enable some of the client devices to avoid having to perform the measurements directly from the cell of the WWAN. As power consumption of client devices may be more critical, the relaying of the measurements information by one or more client devices to other client devices may be a more power efficient method.

In accordance with an aspect of the present disclosure, a method of collaborative communication of measurement information in a communication network, in which a Short Range Wireless Links (SRWL) is established between a first client device and a plurality of second client devices, may include controlling, by a processing device, at the first client device, receiving, over the SRWL, a broadcast Primary Client Device (PCD) Request message transmitted from a third client device of the second client devices; transmitting, over the SRWL, a PCD Accept message to the third client device, based on a determination at the first client device to receive measurement information on a serving cell and neighbor cells of the serving cell which are of a Wireless Wide Area Network (WWAN) through the third client device; and receiving, over the SRWL, from the third client device a PCD Confirm message indicating designation of the third client device as a PCD for the first client device, in which the first client device is a secondary client device (SCD) of the third client device.

In one alternative, the method may further include controlling, by the processing device, at the first client device, receiving the measurement information over the SRWL.

In one alternative, the method may further include controlling, by the processing device, at the first client device, when a second broadcast PCD Request message is received over the SRWL from a fourth client device of the second client devices, transmitting, over the SRWL, a second PCD Accept message to the fourth client device, based on a determination at the first client device to receive second measurement information on a second serving cell and second neighbor cells of the second serving cell through the fourth client device, such that the first client device is a SCD of the fourth client device which is another PCD of the first client device.

In one alternative, the method may further include controlling, by the processing device, at the first client device, receiving the measurement information and the second measurement information over the SRWL.

In one alternative, the method may further include controlling, by the processing device, at the first client device, when a second broadcast PCD Request message is received over the SRWL from a fourth client device of the second client devices, receiving, from the fourth client device over the SRWL, a PCD Revoke message, in which the fourth client device, by sending the PCD Revoke message, accepts the third client device as the PCD for the third client device.

In one alternative, the method may further include controlling, by the processing device, at the first client device, estimating composite measurement information from the first and second measurement information.

In one alternative, the composite information may be determined by filtering or averaging the first and second measurement information for same cells.

In one alternative, a serving cell of the third client device may be same as a serving cell of the fourth client device.

In one alternative, the method may further include controlling, by the processing device, at the first client device, when the first client device as the SCD moves away from a coverage area of one of the third client device and the fourth client device, continuing to receive given measurement information from the other of the third client device and the fourth client device.

In one alternative, the method may further include controlling, by the processing device, at the first client device, when one of the third client device and the fourth client device moves away from a coverage area of the SCD, continuing to receive given measurement information from the other of the third client device and the fourth client device.

In one alternative, the method may further include controlling, by the processing device, at the first client device, when a PCD Revoke message is received over the SRWL from the third client device, determining whether another PCD of the first client device is remaining on the SRWL; when the another PCD is determined to be remaining on the SRWL, continuing to receive another measurement information of another serving cell and neighbor cells of the another serving cell from the another PCD; and when no PCD is determined to be remaining on the SRWL, resuming measurement of a serving cell for the SCD and neighbor cells for the SCD serving cell at the SCD and transmitting, over the SRWL, a PCD Request message indicating the first client device desires to become a PCD.

In one alternative, the method may further include wherein the PCD Request and the second PCD Request messages transmitted over the SRWL respectively from the third client device and the fourth client device include received signal metrics, and the method further comprising: controlling, by the processing device, at the first client device, comparing the received signal metrics from the third and fourth client devices and selecting as a preferred PCD a selected client device of the third and fourth client devices determined to have a best received signal metric.

In one alternative, the received signal metric may include at least one of a Received Signal Strength Indicator (RSSI), Reference Signal Received Power (RSRP), Reference Signal Received Quality (RSRP) or Signal to Interference Noise Ratio (SINR).

In one alternative, the method may further include controlling, by the processing device, at the first client device, requesting, over the SRWL, the PCD to perform measurements on at least one of a serving cell of the SCD or neighbor cells of the SCD serving cell.

In one alternative, the requesting to perform the measurements may include transmitting a list of intra-frequency, inter-frequency, and inter-Radio Access Technology (RAT) cells on which the PCD is requested to perform the measurements.

In one alternative, the requesting to perform the measurements may be by specifying only a Radio Access Technology (RAT) type and frequency band for which the PCD is requested to perform neighbor cell measurements.

In one alternative, the method may further include controlling, by a processing device, at the first client device client device, when a measurements report is received from the PCD indicating measurements performed on cells of a cell list determined from a second cell list of second cells included in a request for PCD measurement from the SCD, performing cell detection on a cell, $C_n$, of the cell list; after detecting the cell $C_n$, synchronizing to the cell $C_n$ for cell reselection or cell selection; and after synchronizing to the cell $C_n$, mapping Relative Time Offsets (RTOs) of neighbor cells from the measurement report respectively to second RTOs relative to the cell $C_n$.

In one alternative, the method may further include controlling, by the processing device, at the first client device, when the SCD is out of a coverage area such that the SRWL with the PCD is not maintainable or the SCD is disconnected from the PCD, exiting a Cellular Neighbor Measurement Broadcast over SRWL (CNMBOS) mode with the PCD and starting neighbor cell measurements according to a predetermined Radio Access Technology (RAT) type specific measurement procedure.

In one alternative, the method may further include controlling, by the processing device, at the first client device, when the SCD is disconnected from the PCD, exiting a Cellular Neighbor Measurement Broadcast over SRWL (CNMBOS) mode with the PCD and starting neighbor cell measurements according to a predetermined Radio Access Technology (RAT) type specific measurement procedure.

In one alternative, the SCD may be preconfigured with at least one Radio Access Technology (RAT) type, frequency or cells for which the SCD is to perform neighbor cell measurements.

In one alternative, the method may further include controlling, by the processing device, at the first client device, when the SCD is disconnected from the PCD or not able to find another PCD in a vicinity of the SCD, starting neighbor cell measurements on given cells of the WWAN.

In one alternative, the method may further include controlling, by the processing device, at the first client device, transmitting over the SRWL to the PCD a request to perform neighbor cell measurements, when the SCD is in idle mode or active communication with the WWAN.

In one alternative, the method may further include controlling, by the processing device, at the client device, when the SCD is disconnected from the PCD and not able to find another PCD for a current location of the SCD, starting performing cell measurements at the SCD.

In one alternative, the method may further include controlling, by the processing device, at the first client device, when the first client device enters a Cellular Neighbor Measurement Broadcast over SRWL (CNMBOS) mode with the PCD and measurements on a serving cell of the SCD and neighbor cells of the SCD serving cell do not need to be performed at the SCD, turning off a Radio Frequency (RF) receiver and baseband receiver of a cellular modem of the first client device and entering a power save state.

In one alternative, the method may further include controlling, by the processing device, at the first client device, transmitting, over the SRWL, a first neighbor cell list indicating first cells for which the PCD is expected to perform measurements;

receiving, over the SRWL from the PCD, a WWAN Measurements List Update Notification message with an updated neighbor cell list indicating at least one given cell for which the PCD can continue to support neighbor cell measurement for the SCD, in which at least one removed cell of the first cells is not on the updated neighbor cell list; transmitting, over the SRWL, to the PCD a Continue CNMBOS mode Confirm message indicating continuation of a Cellular Neighbor Measurement Broadcast over SRWL (CNMBOS) mode with the PCD; and performing measurements for the at least one removed cell.

In one alternative, the method may further include controlling, by the processing device, at the first client device, transmitting, over the SRWL, a first neighbor cell list indicating first cells for which the PCD is expected to perform measurements; receiving, over the SRWL from the PCD, a WWAN Measurements List Update Notification message with an updated neighbor cell list indicating at least one given cell for which the PCD can continue to support neighbor cell measurement for the SCD, in which at least one removed cell of the first cells is not on the updated neighbor cell list; and when a determination is that measurements for the updated neighbor cell list do not satisfy criteria for continuing in a Cellular Neighbor Measurement Broadcast over SRWL (CNMBOS) mode with the PCD, exiting the CNMBOS mode with the PCD, transmitting over the SRWL an Exit CNMBOS mode Confirm message to the PCD and starting performing neighbor cell measurements.

In one alternative, the method may further include controlling, by the processing device, at the first client device, transmitting, over the SRWL, a first neighbor cell list indicating first cells for which the PCD is expected to perform measurements; receiving, over the SRWL from the PCD, updated system information (SI) indicating a change in the SI for a serving cell of the PCD and neighbor cells for the PCD serving cell; based on the updated SI, determining an updated neighbor cell list; and transmitting, over the SRWL to the PCD, the updated neighbor cell list.

In one alternative, the method may further include controlling, by the processing device, at the first client device, when the SCD is in a Cellular Neighbor Measurement Broadcast over SRWL (CNMBOS) mode with the PCD and, based on an estimation, differences are determined between measurements performed by the SCD and measurements performed by the PCD, compensating for the differences in the measurements respectively by the SCD and the PCD, by at least one of (i) continuing to perform cell measurements, after entering the CNMBOS mode with the PCD, or (ii) when a predetermined number of WWAN Measurements Report messages are received while the SCD is in the CNMBOS mode, comparing the measurements of the SCD against an average of values received in a WWAN Measurements Report for each cell indicated in the measurements performed by the PCD and estimating a compensation value for each measurement metric, and when the compensation value is estimated for each measurement metric for each cell indicated in the measurements performed by the PCD, stopping performing measurements at the SCD and starting to use the measurements reports from the PCD in combination with the compensation values to make a cell reselection and handover decision.

In one alternative, the method may further include controlling, by the processing device, at the first client device, periodically updating the compensation values by performing additional measurements at the SCD.

In accordance with an aspect of the present disclosure, an apparatus may provide for collaborative communication of measurement information in a communication network, in which a Short Range Wireless Links (SRWL) is established between a first client device and a plurality of second client devices. The apparatus may include circuitry configured to control, at the first client device, receiving, over the SRWL, a broadcast Primary Client Device (PCD) Request message transmitted from a third client device of the second client devices; transmitting, over the SRWL, a PCD Accept message to the third client device, based on a determination at the first client device to receive measurement information on a serving cell and neighbor cells of the serving cell which are of a Wireless Wide Area Network (WWAN) through the third client device; and receiving, over the SRWL, from the third client device a PCD Confirm message indicating designation of the third client device as a PCD for the first client device, in which the first client device is a secondary client device (SCD) of the third client device.

In accordance with an aspect of the present disclosure, a wireless communication device may include a receiver to receive a wireless communication; and a processing device configured for collaborative communication of measurement information in a communication network, in which a Short Range Wireless Links (SRWL) is established between the wireless communication device and a plurality of second client devices, wherein the processing device is configured to control receiving, over the SRWL, a broadcast Primary Client Device (PCD) Request message transmitted from a third client device of the second client devices; transmitting, over the SRWL, a PCD Accept message to the third client device, based on a determination at the wireless communication device to receive measurement information on a serving cell and neighbor cells of the serving cell which are of a Wireless Wide Area Network (WWAN) through the third client device; and receiving, over the SRWL, from the third client device a PCD Confirm message indicating designation of the third client device as a PCD for the wireless communication device, in which the wireless communication device is a secondary client device (SCD) of the third client device.

DETAILED DESCRIPTION

Figure 1:
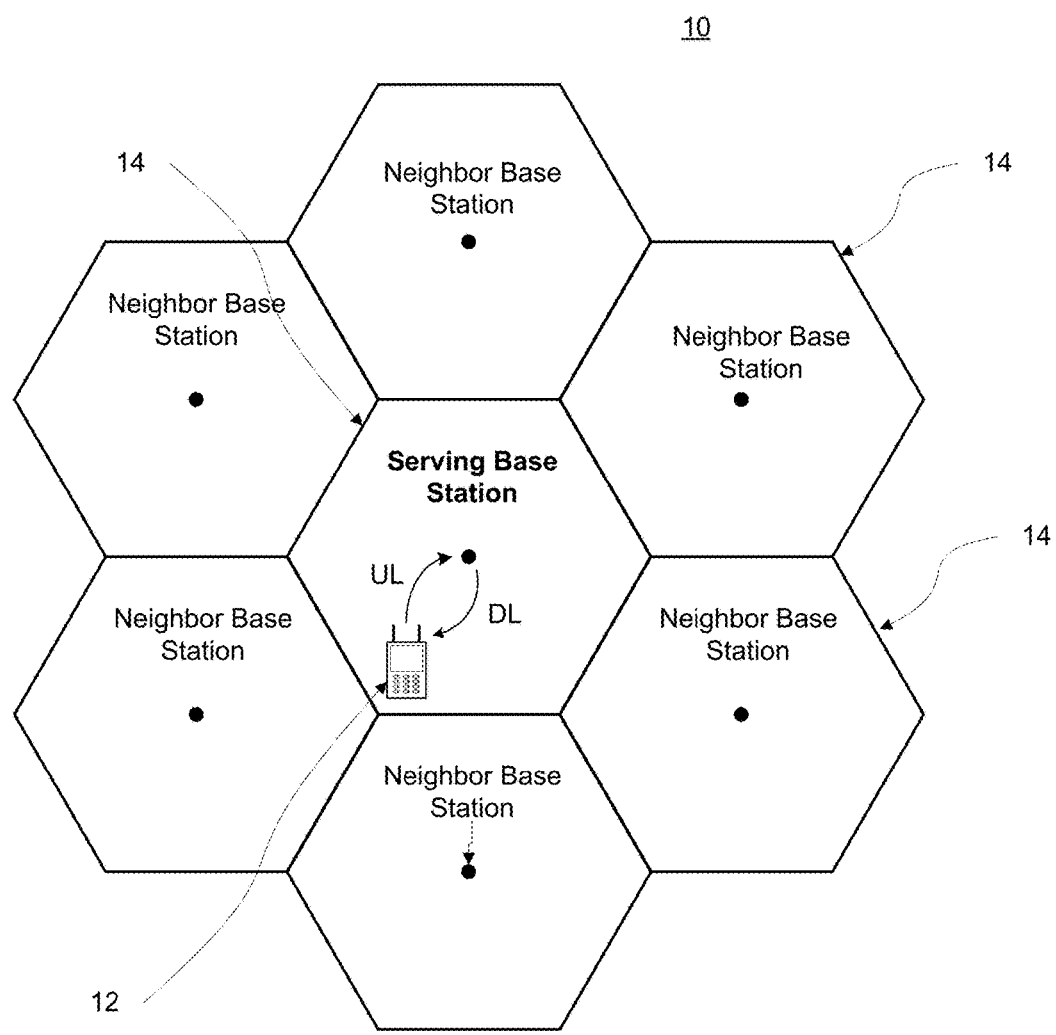
FIG. 1 illustrates a conventional mobile wireless communication system.
Figure 2:
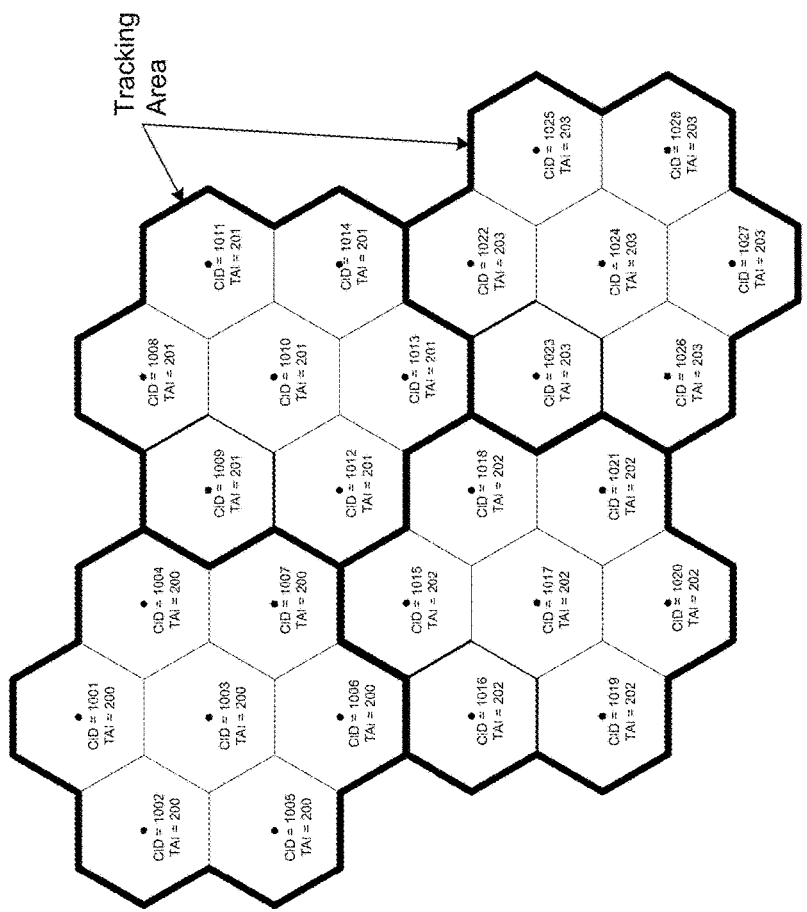
FIG. 2 illustrates the grouping of cells into tracking areas in a wireless communication system.
Figure 3:
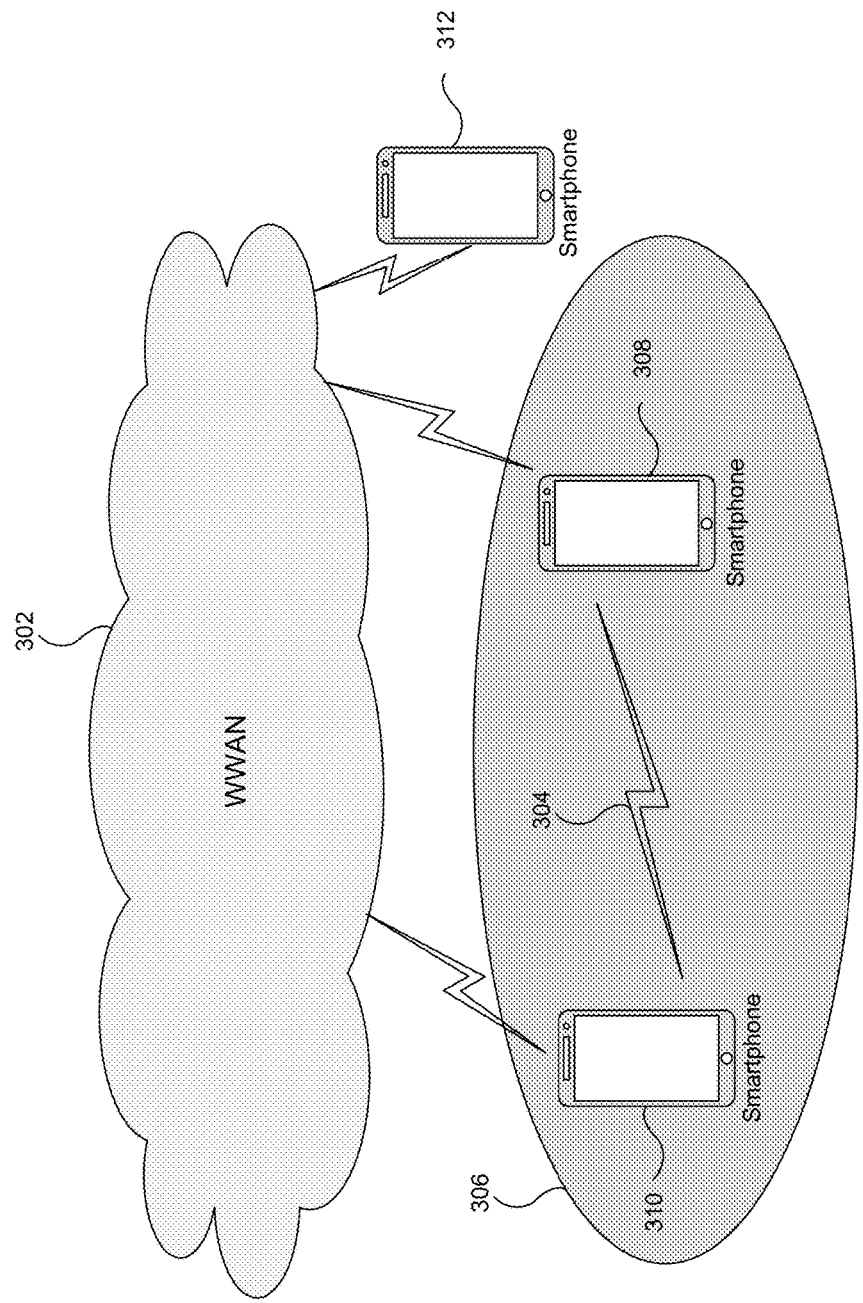
FIG. 3 illustrates a use case of two client devices in close proximity of each other using Wireless Wide Area Network (WWAN) and Short Range Wireless Links (SRWL).

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although the aspects of the present disclosure may use the 3GPP LTE as an example for a WWAN used by client devices, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the client devices, other SRWL such as Bluetooth™ may be used.

The types of client devices connected to a WWAN may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, short message services (SMS), etc. from the WWAN.

According to an aspect of the present disclosure, one or more client devices in a given local area may be capable of taking the role of performing measurements on serving and neighbor cells and relaying the measurements information to the other client devices in the local area. The client device that may take the role of performing measurements on serving and neighbor cells and relaying the measurements information to the other client devices is designated as Primary Client Device (PCD) and the one or more client devices receiving the measurements information from the PCD in the local area are referred to as Secondary Client Devices (SCDs). Methods for establishing a PCD and an SCD in a SRWL may be in accordance with the aspects described in U.S. application Ser. No. 15/351,999 filed Nov. 15, 2016 and Ser. No. 15/352,097, filed Nov. 15, 2016, incorporated by reference herein, for the purpose of system information decoding and relaying in a collaborative manner. In the present disclosure, the PCD and SCD may be established for the purpose of performing measurements and relaying the measurements information. According to an aspect of the present disclosure, a client device may announce its capability and readiness to take the role of PCD by sending a broadcast message "PCD Request" over the SRWL. According to an aspect of the present disclosure, the one or more client devices receiving the "PCD Request" message over SRWL may determine to receive the serving and neighbor cells measurements information through the client device making the announcement and may send a "PCD Accept" message. After the "PCD Accept" message from one or more client devices is received by the client device that initiated the negotiation may be designated as the PCD. It may broadcast its role as PCD by sending a message "PCD Confirm" to conclude the negotiation. Once a PCD is established over a given SRWL, other client devices that accepted the established PCD may be referred to as SCDs.

Figure 4:
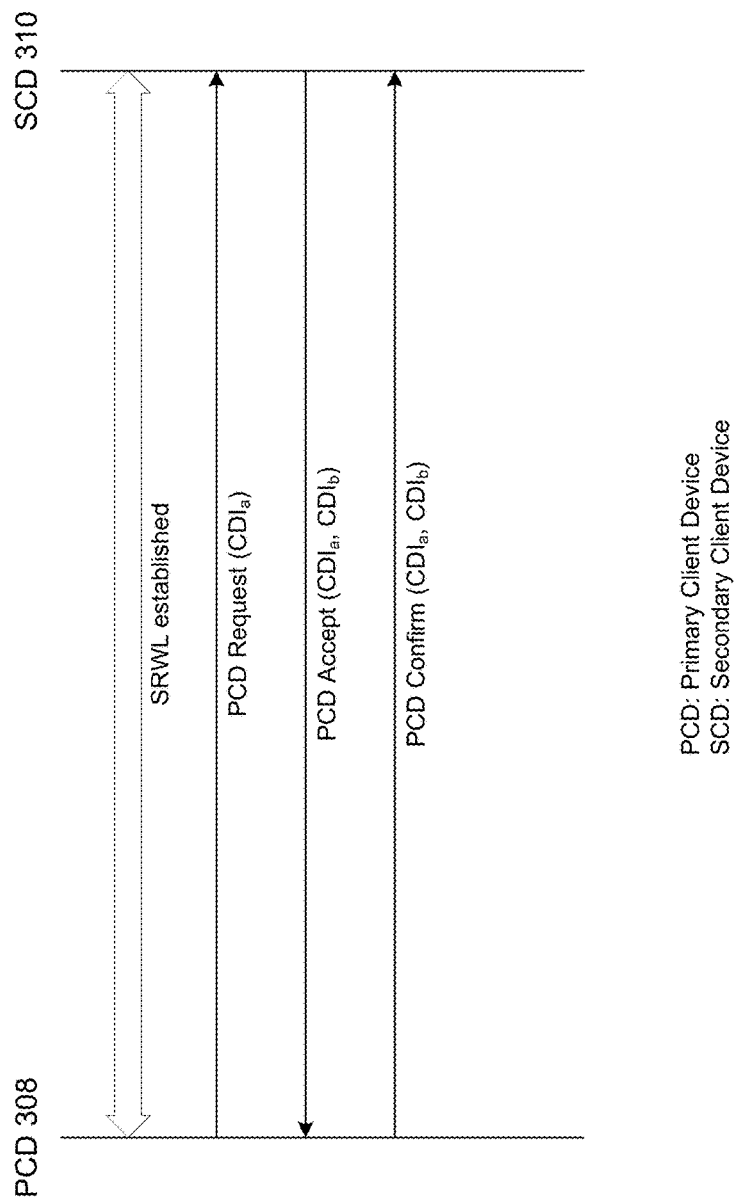
FIG. 4 illustrates a Message Sequence Chart (MSC) for an example scenario for establishing a Primary Client Device (PCD) in SRWLs according to the aspects of the present disclosure.

The Message Sequence Chart (MSC) for the messages exchanged between the client devices Smartphone 308 and the Smartphone 310 over the SRWL for establishing the PCD according to the aspects of the present disclosure is illustrated in FIG. 4. Initially, the SRWL link may be established between the client devices Smartphone 308 and the Smartphone 310 as per the protocols of the particular SRWL being used. The client device Smartphone 308 may broadcast a "PCD Request" message over the SRWL and the message may include its own CDI=$CDI_a$. The client device Smartphone 310 may receive this message and may determine to accept the Smartphone 308 as PCD and may broadcast over the SRWL the "PCD Accept" message which may include the CDI=$CDI_a$ of the Smartphone 308 and its own CDI=$CDI_b$. Upon receiving this message, the Smartphone 308 may check the first CDI that is part of the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310 which is established as an SCD.

According to an aspect of the present disclosure, two or more client devices may simultaneously announce their capability and readiness to take the role of PCD by sending broadcast message "PCD Request" over the SRWL. According to an aspect of the present disclosure, the one or more client devices receiving the "PCD Request" message from the multiple announcement over SRWL may determine to receive the serving and neighbor cells measurements information through one of the client devices making the announcement and may send a "PCD Accept" message which may include the identity of the client device making the announcement. After the "PCD Accept" message from one or more client devices is received by a client device that initiated the negotiation and the message includes its identity, then it may be designated as the PCD. The client device that made the announcement and first received the acceptance message from one of the client device may broadcast its role as PCD by sending a message "PCD Confirm" to conclude the negotiation. According to an aspect of the present disclosure, in a first alternative, the other client devices that made the announcement to take the role of PCD may revoke their offer by sending a "PCD Revoke" message. According to an aspect of the present disclosure, the client devices revoking their offer may accept the PCD role of the client device that first sent the "PCD Confirm" message. According to an aspect of the present disclosure, in a second alternative, there may be multiple PCDs in a single SRWL. According to an aspect of the present disclosure, the other client devices that made the announcement to take the role of PCD may retain their offer to serve as PCD and may continue to wait for configurable time for some client devices to accept their offer. According to an aspect of the present disclosure, some client devices may accept a different client device as a PCD by sending the "PCD Accept" message to that client device.

According to an aspect of the present disclosure, some client devices may accept multiple client devices as their PCD. According to an aspect of the present disclosure, the client device with multiple PCDs may receive the serving and neighbor cells measurements information from multiple PCDs. The serving and neighbor cells measurements information from multiple PCDs may relate to the same set of cells or different set of cells depending on whether the two or more PCDs are camped on the same cell or different cells. According to an aspect of the present disclosure, a client device having multiple PCDs may have an increased likelihood of receiving the serving and neighbor cells measurements information from at least one PCD. According to an aspect of the present disclosure, a client device with multiple PCDs may receive serving and neighbor cells measurements information from multiple PCDs and this in turn may be used by the SCD receiving the measurement information to estimate more reliable measurements information, for example, by filtering or averaging the multiple measurements information from different PCDs for the same cells.

Figure 5:
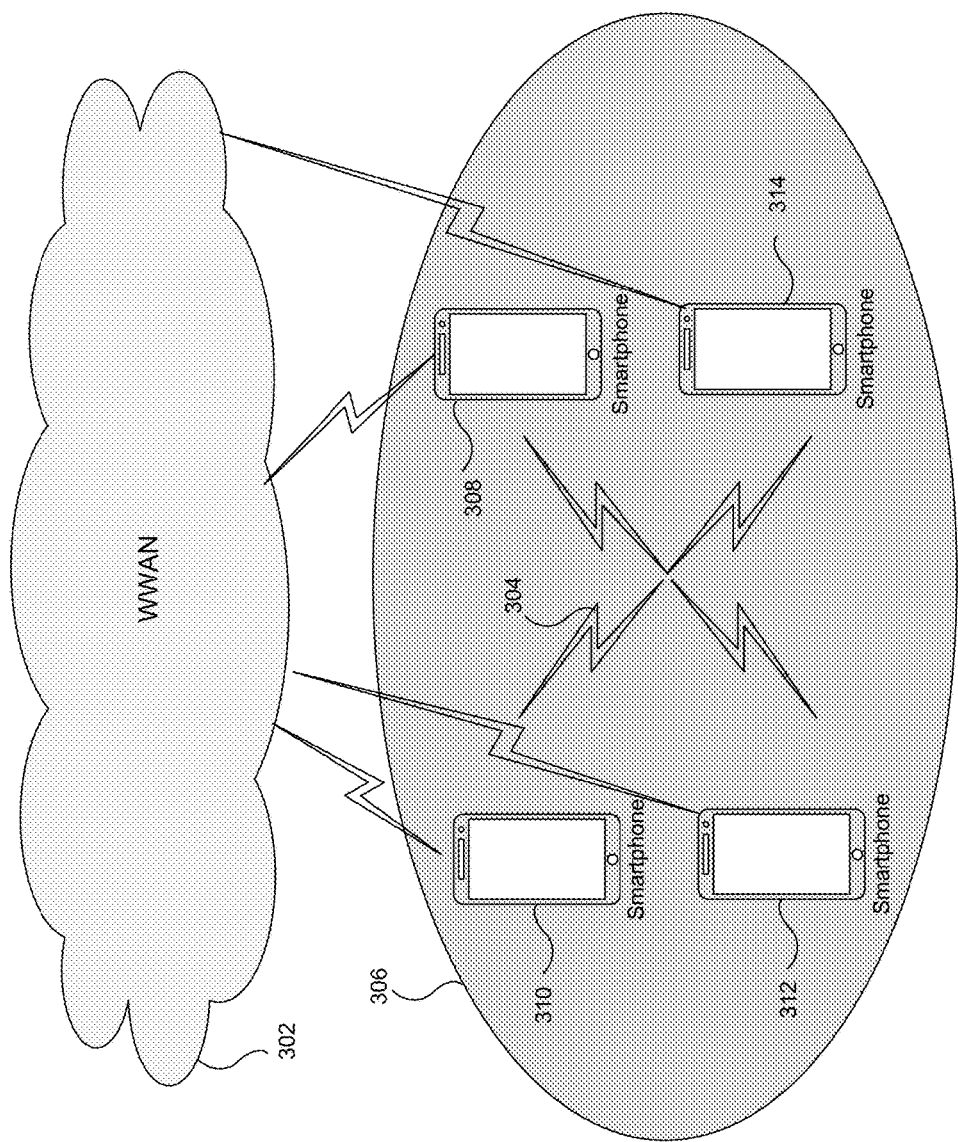
FIG. 5 illustrates a use case of more than two client devices in close proximity of each other using WWAN and SRWL.

An example of a scenario is illustrated in FIG. 5 which includes the WWAN 302 and the SRWL 304 amongst the four client devices Smartphone 308, Smartphone 310, Smartphone 312 and Smartphone 314. The SRWL 304 has the coverage area 306. All four client devices are connected to the WWAN and directly with each other over the SRWL.

Figure 6:
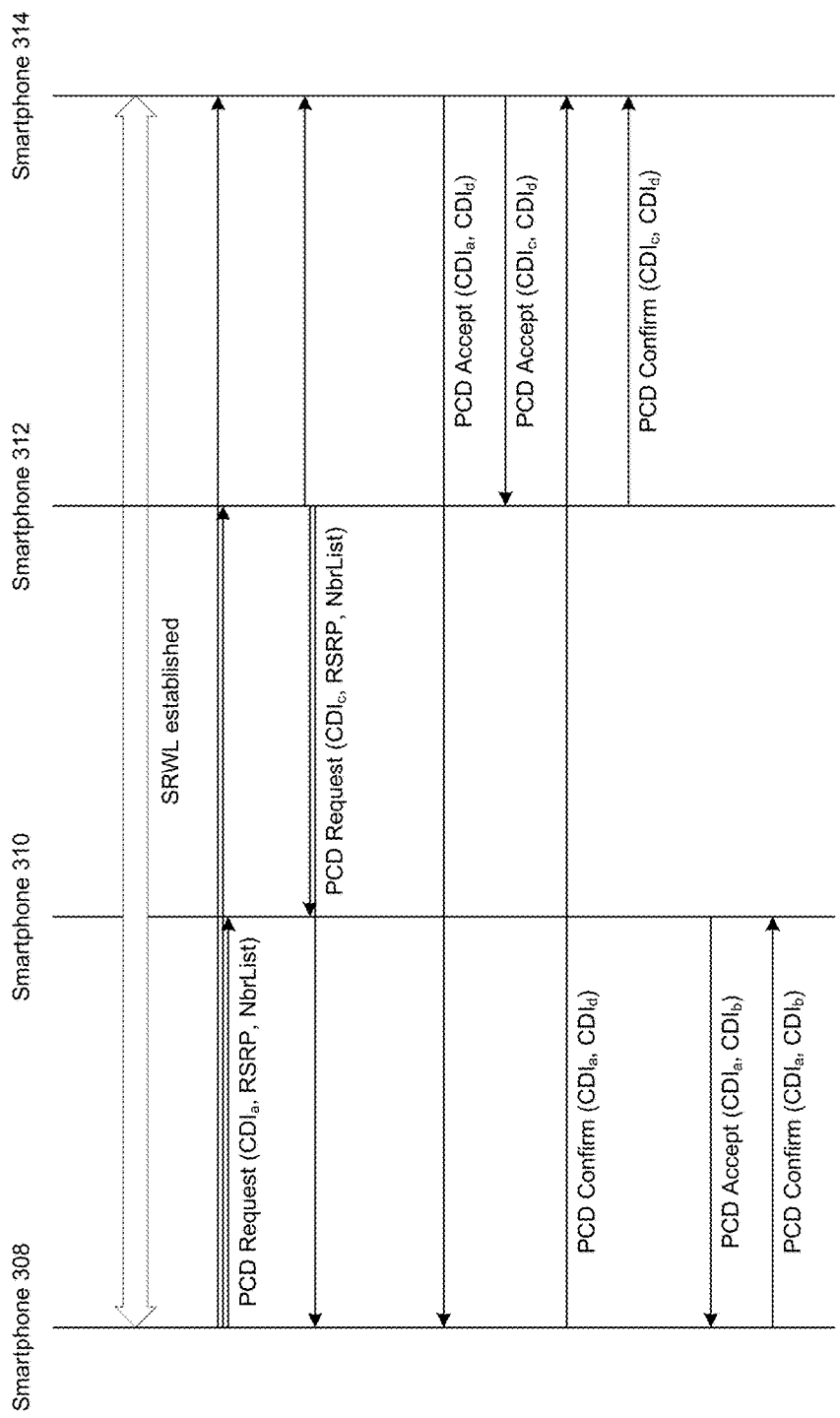
FIG. 6 illustrates an MSC for an example scenario for establishing multiple PCDs in an SRWL according to the aspects of the present disclosure.

The MSC for the case when multiple client devices simultaneously announce their capability and readiness to take the role of PCD is illustrated in FIG. 6. Initially, the SRWL link may be established amongst all four client devices as per the protocols of the particular SRWL being used. The client device Smartphone 308 may broadcast a "PCD Request" message over the SRWL and the message may include its own CDI=$CDI_a$. Immediately after that the client device Smartphone 312 may broadcast a "PCD Request" message over the SRWL and the message may include its own CDI=$CDI_c$.

The client device Smartphone 314 may receive both the "PCD Request" messages and may determine to accept both the Smartphone 308 and Smartphone 312 as PCDs and may broadcast over the SRWL two separate "PCD Accept" messages which may include the CDI pair ($CDI_a$, $CDI_d$) and the pair ($CDI_c$, $CDI_d$), where $CDI_d$ is the CDI of the Smartphone 314. Upon receiving the message with CDI pair ($CDI_a$, $CDI_d$), the Smartphone 308 may check the first CDI inside the message and find that it is matching with its own CDI and may conclude that the Smartphone 314 has accepted it as a PCD. Finally, the Smartphone 308 may broadcast the "PCD Confirm" message which may include the CDI of both the Smartphone 308 and Smartphone 314. From this point forward, the Smartphone 308 may be established as the PCD for the Smartphone 314. Similarly, upon receiving the message with CDI pair ($CDI_c$, $CDI_d$), the Smartphone 312 may check the first CDI inside the message and find that it is matching with its own CDI and may conclude that the Smartphone 314 has accepted it as a PCD. Finally, the Smartphone 312 may broadcast the "PCD Confirm" message which may include the CDI of both the Smartphone 312 and Smartphone 314. From this point forward, the Smartphone 312 may also be established as the PCD for the Smartphone 314. The client device Smartphone 310 may also receive both the "PCD Request" messages and may determine to accept only the Smartphone 308 as PCD and may broadcast over the SRWL a "PCD Accept" message which may include the CDI pair ($CDI_a$, $CDI_b$) where $CDI_b$ is the CDI of the Smartphone 310. Upon receiving the message with CDI pair ($CDI_a$, $CDI_b$), the Smartphone 308 may check the first CDI inside the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310.

The SCDs and/or PCDs may be mobile and may move away from the coverage area of the SRWL. According to an aspect of the present disclosure, if an SCD has multiple PCDs and moves away from the coverage area of one of its PCDs, it may continue to receive the serving and neighbor cells measurements information from the remaining PCDs. According to an aspect of the present disclosure, if one of the PCDs moves away from the coverage area of an SCD, the SCD may continue to receive the serving and neighbor cells measurements information from the remaining PCDs.

According to an aspect of the present disclosure, a PCD may determine to end its role as a PCD and may send a "PCD Revoke" broadcast message. According to an aspect of the present disclosure, the SCDs receiving this message may first determine whether there are any remaining PCDs on the SRWL. According to an aspect of the present disclosure, if there is at least one PCD remaining on the current SRWL, the SCD may continue to receive the serving and neighbor cells measurements information from the remaining PCD. According to an aspect of the present disclosure, if there is no PCD remaining on the current SRWL, the client device that was previously an SCD may determine to take the role of PCD by first resuming direct serving and neighbor cells measurements on its own and then making the announcement using the "PCD Request" message. The further protocols for establishing a PCD are as per the aspects described earlier.

According to an aspect of the present disclosure, a client device with the best received signal metric may be preferred as a PCD. According to an aspect of the present disclosure, the client device making the announcement to take the role of PCD may include its received signal metrics in the "PCD Request" message. According to an aspect of the present disclosure, the client devices receiving this message from one or more client devices may compare their received signal metrics and may choose a client device with the best received signal metric as their preferred PCD. The received signal metric may be Received Signal Strength Indicator (RSSI), Reference Signal Received Power (RSRP), Reference Signal Received Quality (RSRP), Signal to Interference and Noise Ratio (SINR), etc.

After at least one PCD is established in a given SRWL, the actual relaying of the serving and neighbor cells measurements information over SRWL may be performed as described in U.S. patent application Ser. No. 15/290,664 filed Oct. 11, 2016. According to an aspect of the present disclosure, the PCD and the SCD may communicate through the SRWL and may exchange their WWAN capabilities such as the RAT types supported by them. For example, the PCD and the SCD may be supporting one or more of the following RAT types: CDMA, GSM, LTE, GPRS, etc.

According to an aspect of the present disclosure, the PCD and the SCD may communicate with each other the current WWAN identity (i.e., PLMN ID), the RAT types, the CID, the TAI, the frequency of the channel, default DRX cycle or paging cycle, etc. for the cell they are camped on. If there is more than one SCD connected to the PCD, each SCD may communicate to the PCD the information about the cell it is camped on.

According to an aspect of the present disclosure, an SCD may request the PCD to perform measurements on the SCD's serving and/or neighbor cells. According to an aspect of the present disclosure, an SCD may send a list of intra-frequency, inter-frequency, and inter-RAT cells on which it requests the PCD to make measurements. Alternatively, according to an aspect of the present disclosure, the SCD may specify only the RAT types and the frequency bands for which it may request the PCD to make neighbor cell measurements.

According to an aspect of the present disclosure, the PCD may evaluate its own neighbor cell measurements schedule and may determine whether it can perform measurements on one or more, including all, of the cells included in the list provided by the SCD. After making the determination, the PCD may communicate to the SCD about the list of cells on which the PCD may be able to make measurements. According to an aspect of the present disclosure, if the PCD can make measurements on at least one of the cells from the list of cells provided by the SCD, then the PCD may send to the SCD a positive acknowledgement along with the list of cells on which it can make the measurements. Upon reception of the acknowledgment from the PCD, both the SCD and the PCD may enter Cellular Neighbor Measurement Broadcast over SRWL (CNMBOS) mode. According to an aspect of the present disclosure, the PCD may determine that it may be unable to perform measurements on any of the cells in the list provided by the client terminal and it may deny the measurements request entirely by sending a negative acknowledgment.

According to an aspect of the present disclosure, after the PCD enters CNMBOS mode, it may perform periodic measurements on the agreed list of cells. According to an aspect of the present disclosure, after making the measurements on the agreed list of cells, the results may be organized in a measurements report and may be transmitted to the SCD. The measurements report may include the identifying details of each cell such as CID, frequency, RAT types, etc. and the actual measurement metrics such as Received Signal Strength Indicator (RSSI), Reference Signal Received power (RSRP), Reference Signal Received Quality (RSRQ), timing offsets, etc. The measurement metric type may be different for different RAT types.

According to an aspect of the present disclosure, the PCD and the SCD may negotiate the configuration for performing the measurements. For example, the configuration for making the measurements may include the periodicity, filtering coefficients, reporting criteria, etc. The PCD may evaluate its own neighbor cell measurements schedule and may determine whether it can accept one of the measurement configurations.

Alternatively, according to an aspect of the present disclosure, the PCD and the SCD may use default values for the measurement configuration, e.g., perform measurements once every 200 ms without any filtering and report the measurement only if it exceeds a certain threshold, e.g., when RSRP>−120 dBm.

According to an aspect of the present disclosure, during the process of making measurements, the PCD may detect neighbor cells that may not be part of the list of cells requested by the SCD. According to an aspect of the present disclosure, the PCD may include the newly detected and measured neighbor cells details in the measurements report transmitted to the SCD.

According to an aspect of the present disclosure, the PCD may keep one best cell, e.g., cell $C_m$, of a particular RAT type and frequency as a timing reference for determining the relative time offset (RTO) of all the other detected cells in the same RAT type and frequency. According to an aspect of the present disclosure, the PCD may determine and report the RTOs for all the detected cells in the measurements report it may send to the SCD. The measurements report may include the identity of the cell that was used as a timing reference for the measurements report. According to an aspect of the present disclosure, the PCD may keep the SCD serving cell, say $C_s$, as the cell for timing reference and report the other cell timing offset with respect to that of the current serving cell $C_s$ of the SCD.

According to an aspect of the present disclosure, if the SRWL through which the PCD and the SCD are connected allows them to be time synchronized, the PCD may use the synchronized time as a common time reference for reporting the RTOs for all detected neighbor cells from all RAT types and frequencies. For example, if the WLAN is used as SRWL, the beacon signal of the WLAN may be used a time reference for reporting the RTO for all the detected cells. The SCD may use the measurements report that may include the RSSI, RSRP, RSRQ, and the RTO for cell reselection or cell selection purposes.

According to an aspect of the present disclosure, after receiving the measurements report from the PCD, the SCD may prefer to do its own cell detection for one of the detected cells, e.g., cell $C_n$, reported by the PCD in the measurements report. According to an aspect of the present disclosure, after detecting the cell $C_n$, the SCD may synchronize to that cell for cell reselection or cell selection. According to an aspect of the present disclosure, after synchronizing to the cell $C_n$, the SCD may map the neighbor cell RTOs from the measurement report received from the PCD to the RTOs relative to the cell $C_n$ on which it is currently camped.

According to an aspect of the present disclosure, if an SCD goes out of coverage area and can no longer maintain the SRWL with the PCD, the SCD may exit CNMBOS mode and may start neighbor cell measurements on its own as per normal RAT type specific measurement procedures.

According to an aspect of the present disclosure, if an SCD disconnects with the PCD, then the SCD may exit CNMBOS mode and may start neighbor cell measurements on its own as per normal RAT type specific measurement procedures.

According to an aspect of the present disclosure, at any point of time, the PCD may communicate to the SCD that it is about to exit CNMBOS mode and before exiting the CNMBOS mode the PCD may send the most recent neighbor measurements report to the SCD.

Multiple SCDs may be connected to the PCD over the SRWL. According to an aspect of the present disclosure, the PCD may enter CNMBOS mode individually with multiple SCDs simultaneously. In many cases, multiple SCDs and the PCD may be camped on to the same cell of the same RAT type and frequency of the same WWAN. According to an aspect of the present disclosure, in some scenarios, the PCD may perform a single set of measurements and organize the measurements report as a single composite report and may send it as a broadcast message addressing all the SCDs that have entered into the CNMBOS mode with it. This method enables a single set of measurements to be used for multiple SCDs. According to an aspect of the present disclosure, in some scenarios, the PCD may perform more than one set of measurements and organize them in multiple measurements reports and may send them as broadcast messages addressing all the SCDs that have entered into the CNMBOS mode with it. Alternatively, the measurements reports may be sent to respective individual SCDs using dedicated messages (unicast).

According to an aspect of the present disclosure, a PCD may enter CNMBOS mode autonomously, without negotiating with any SCD, and may start broadcasting neighbor cell measurements reports for its currently camped serving cell and all the detected neighbor cells belonging to the same network. According to an aspect of the present disclosure, the PCD may only broadcast the measurements reports whenever there is at least one SCD connected to it over SRWL.

According to an aspect of the present disclosure, the SCD may be preconfigured with a set of RAT types, frequencies, and/or cells for which it may be expected to do neighbor cell measurements.

According to an aspect of the present disclosure, the PCD may report the neighbor cell measurements through an application based on a peer-to-peer protocol which may run in the PCD and in the SCD. The peer-to-peer protocol based application may communicate through a logical channel provided by the SRWL that is used between the PCD and the SCD. The peer-to-peer protocol based application may be independent of the particular SRWL used and it may be achieved through a virtual communication port established in both the PCD and in the SCD. For example, in case of WLAN, the peer-to-peer protocol may be a Transmission Control Protocol (TCP)/Internet Protocol (IP) socket communication between the PCD and the SCD.

According to an aspect of the present disclosure, the PCD may decide to create a new physical or logical channel, namely, Cellular Neighbor Cell Measurement Broadcast Channel (CNCMBC) where the PCD and the SCD may pre-negotiate and dedicate that physical or logical channel for the CNMBOS mode related information exchange. The CNCMBC may be defined with a periodicity and time slot where the PCD may unicast or broadcast the neighbor cell measurements reports and the SCDs may monitor the CNCMBC on a pre-defined agreed upon periodicity and time slot to receive the neighbor cell measurements report from the PCD.

According to an aspect of the present disclosure, when an SCD is disconnected from a PCD, and if the SCD is unable to find another PCD in its vicinity, then the SCD on its own may start making neighbor cell measurements on the cells of the WWAN.

According to an aspect of the present disclosure, the SCD may request the PCD to perform neighbor cell measurements when the SCD is in idle mode as well as when it is in active communication with the WWAN.

Figure 7:
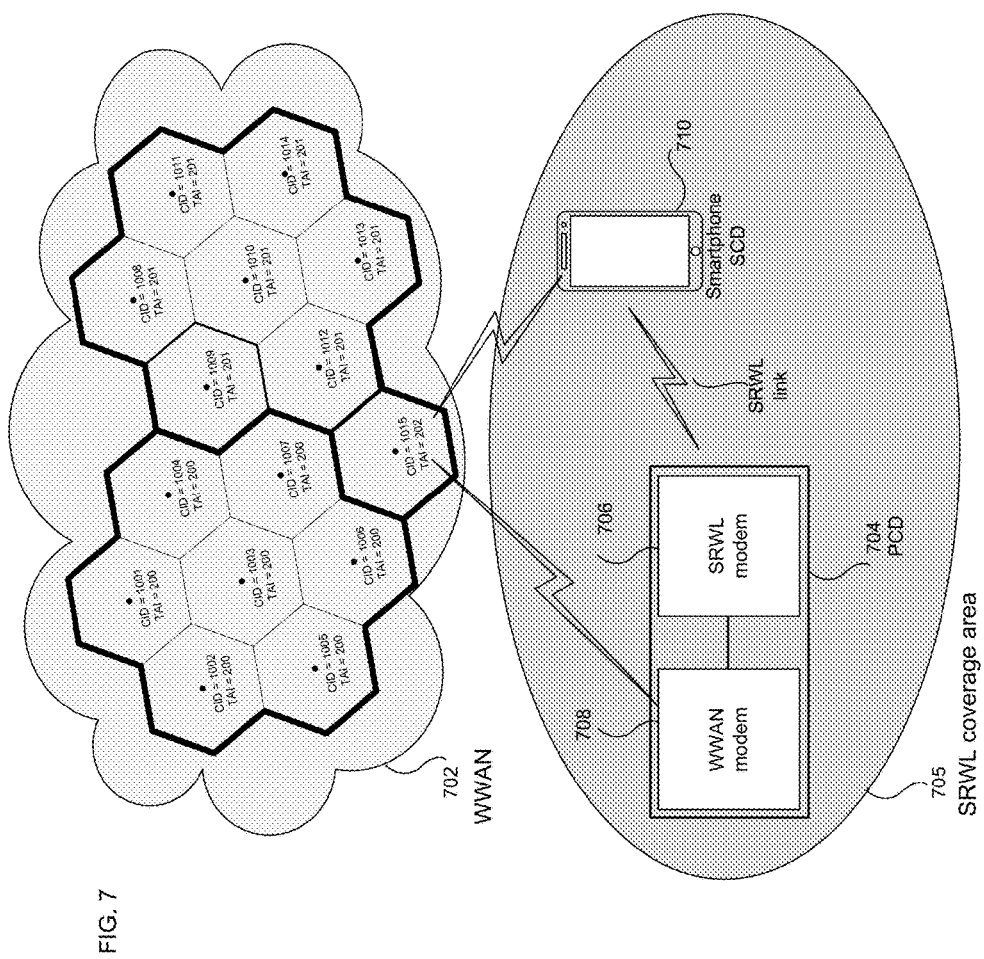
FIG. 7 illustrates an example scenario where a PCD and a Secondary Client Device (SCD) may be camped on the same cell of the same WWAN.

FIG. 7 illustrates an example scenario for the application of present disclosure. As shown in FIG. 7, WWAN coverage 702 and coverage 705 of PCD 704 are illustrated. The PCD 704 comprises the WLAN Access Point (modem) 706 and WWAN modem 708. In another implementation both WLAN modem and WWAN modem may be a single unit. The WWAN modem 708 is connected to the cell with CID 1015 in the WWAN 702. The SCD Smartphone 710 communicates with the PCD 704 over the WLAN link for internet services. The SCD Smartphone 710 also communicates with the cell with CID 1015 for voice calls, SMS, and other services (except internet) provided by the WWAN 702.

Figure 8:
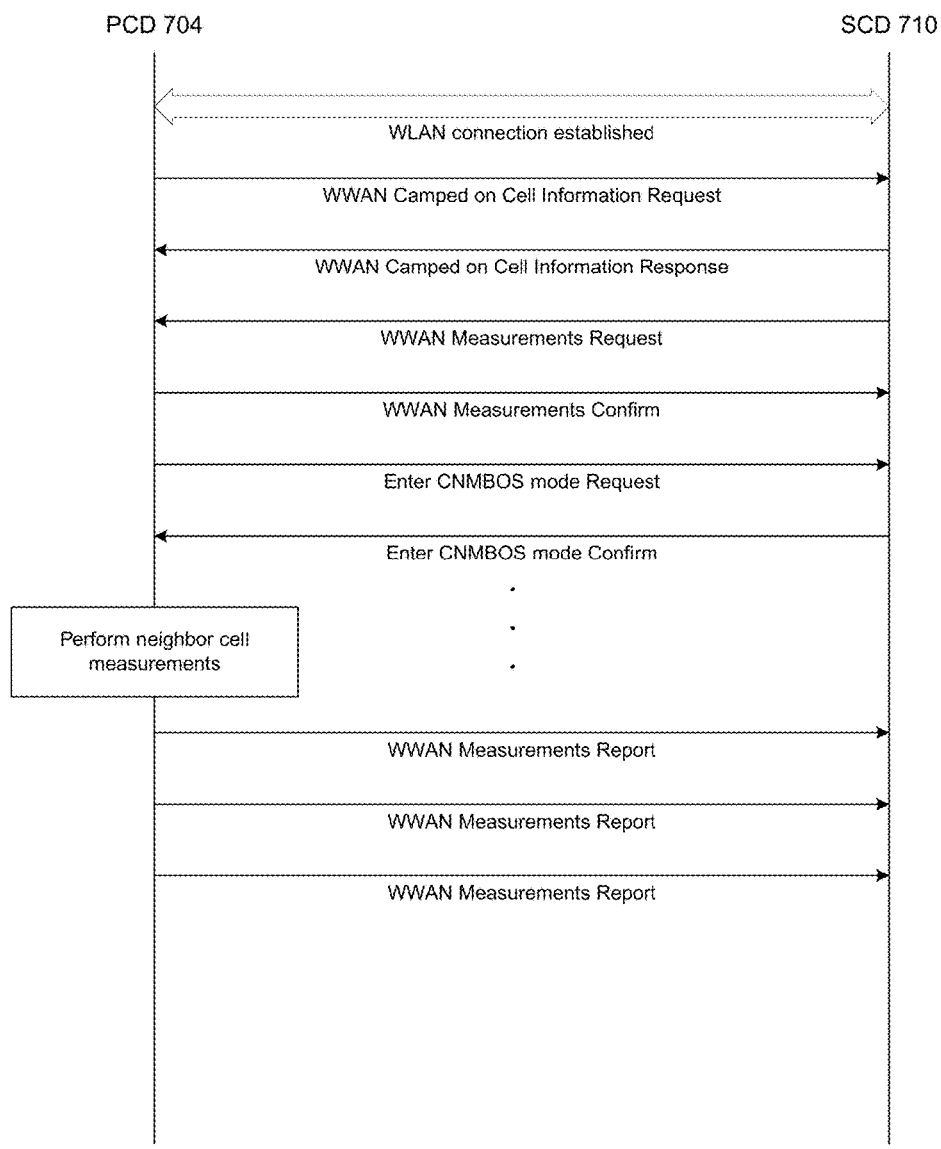
FIG. 8 illustrates an MSC for an example scenario for a PCD and an SCD entering Cellular Neighbor Measurement Broadcast over SRWL (CNMBOS) mode according to the aspects of the present disclosure.

The Message Sequence Chart (MSC) for the messages exchanged between the PCD 704 and the SCD Smartphone 710 over the WLAN link for entering the CNMBOS mode according to the aspects of the present disclosure is illustrated in FIG. 8. The two entities PCD 704 and the SCD Smartphone 710 involved in the message exchanges are illustrated at the top. Initially, the WLAN link between the two entities may be established. Next the PCD 704 may send the "WWAN Camped on Cell Information Request" message, which may include the CID, TAI, frequency, the RAT type, and the PLMN ID of the cell on which the PCD 704 is camped, to the SCD Smartphone 710 which in return may send the "WWAN Camped on Cell Information Response" message which may include the CID, TAI, frequency, the RAT type, and the PLMN ID of the cell on which the SCD Smartphone 710 is camped. The SCD Smartphone 710, based on the information received in the "WWAN Camped on Cell Information Request" message, it may determine to request the PCD to make measurement on the SCD Smartphone 710 serving and neighbor cells. The SCD Smartphone 710 may prepare a "WWAN Measurements Request" message which may include the intra-frequency, inter-frequency, and inter-RAT cells on which the SCD Smartphone 710 requests the PCD 704 to make measurements. The SCD Smartphone 710 may include the measurement configuration related parameters in the "WWAN Measurements Request" message. Upon receipt of the "WWAN Measurements Request" message, the PCD 704 may compare the requested RAT types, frequencies and cells with its own measurement capabilities and the time available to make measurements after accounting for time required for making measurements for its own serving and neighbor cells. The PCD 704 may determine that it is able to perform measurements on a subset of the RAT types, frequencies and cells requested by the SCD Smartphone 710. The PCD 704 may then send a "WWAN Measurements Confirm" message which may include the list of RAT types, frequencies and cells on which the PCD may be able to make measurements with the supported measurement configuration parameters. Next both the PCD and the SCD Smartphone 710 may enter CNMBOS mode. Subsequently, as per the configuration parameters in the "WWAN Measurements Confirm" message, the PCD may make periodic measurements, prepare a "WWAN Measurements Report" message, and transmit the report to the SCD Smartphone 710. Based on the contents of the received "WWAN Measurements Report" message, the SCD Smartphone 710 may take further actions such as cell reselection or may take no action at all depending on the RAT type specific criteria.

Figure 9:
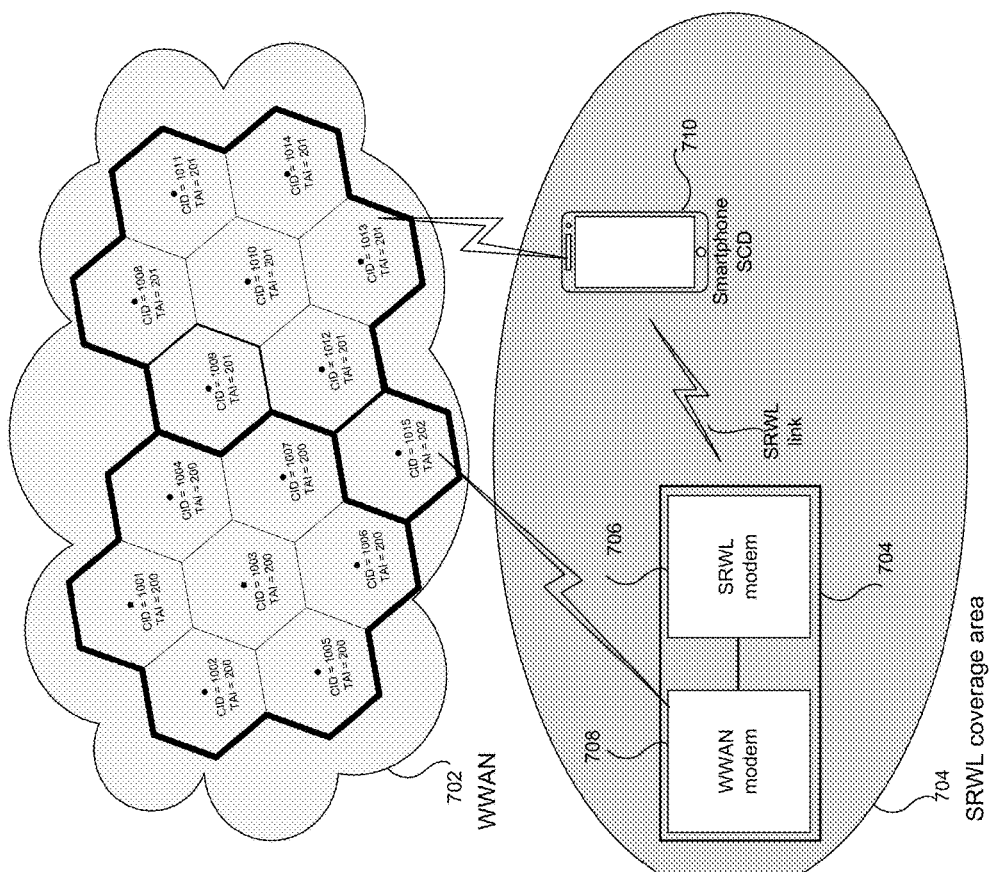
FIG. 9 illustrates an example scenario where a PCD and an SCD may be camped on different cells of the same WWAN.
Figure 10:
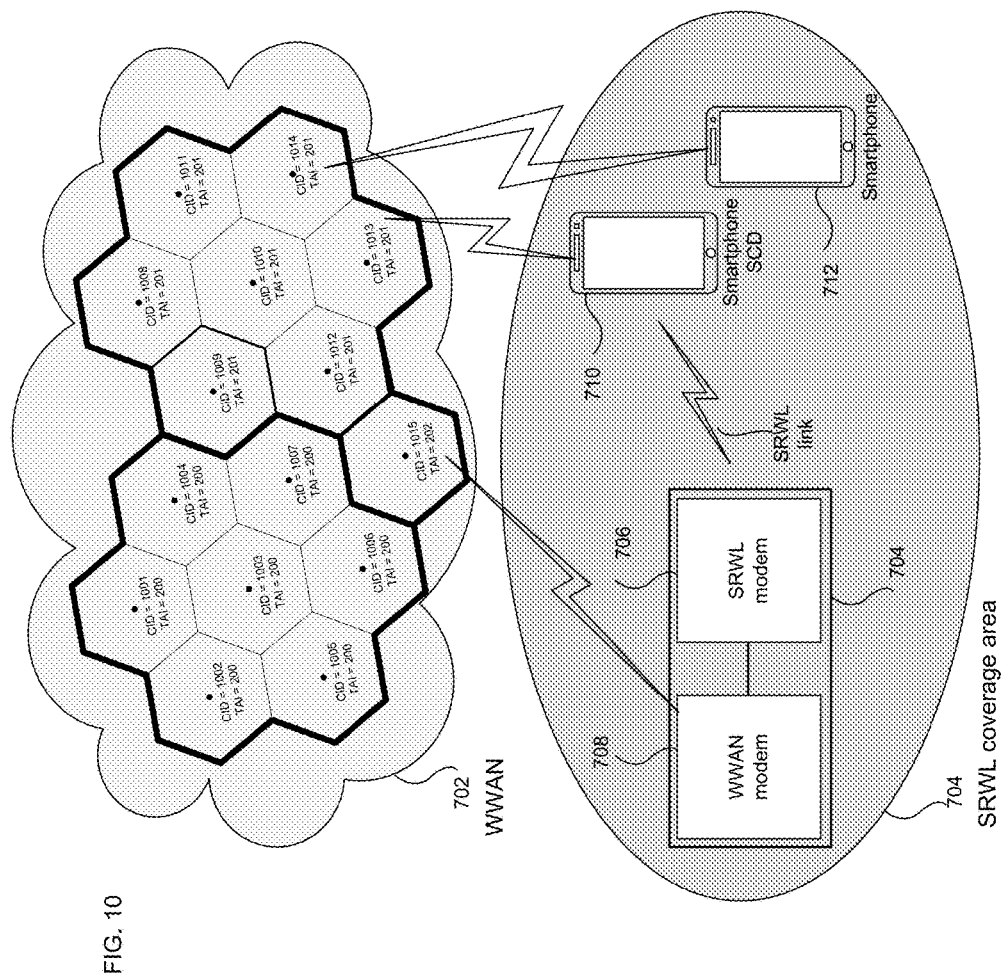
FIG. 10 illustrates an example scenario where a PCD and two SCDs and all of them may be camped on different cells of the same WWAN.

In FIG. 7, the PCD 704 and the SCD Smartphone 710 are shown to be camped on the same cell. However, the present disclosure is applicable to the case where the PCD 704 and the SCD Smartphone 710 may be camped on different cells. This is illustrated in FIG. 9, where the PCD 704 is camped on cell with CID=1015 and the SCD Smartphone 710 is camped on cell with CID=1013. Furthermore, when there are multiple SCDs connected to the PCD, the multiple SCDs may or may not be camped on the same cell. An example scenario with two SCDs is illustrated in FIG. 10 where the PCD 704, the SCD Smartphone 710, and the SCD Smartphone 712 are camped on three different cells although all three are connected to each other over the same SRWL. Specifically, the PCD is camped on cell with CID=1015 and the SCD Smartphone 710 is camped on cell with CID=1013, and the SCD Smartphone 712 is camped on cell with CID=1014.

According to an aspect of the present disclosure, when a PCD may be built with multiple (for example, M) receiver/decoder circuits, it may make measurements in parallel even for the overlapping measurement windows from multiple (for example, N) cells of the same or different frequencies and RAT types. Note that M and N may not necessarily be the same.

According to an aspect of the present disclosure, when an SCD disconnects from the PCD and if the SCD is not able to find another PCD in its current location, then SCD may start performing measurements on its own.

A PCD may be equipped with more than one source for primary sources of internet. For example, a PCD may be equipped with a cable modem and a WWAN modem. According to an aspect of the present disclosure, a PCD may be using the cable modem to provide internet service while it may be using the WWAN modem strictly for performing measurements on cells of WWAN, i.e., a PCD need not be using the WWAN for providing internet service in order to make measurements on WWAN cells.

An SCD operating according to the aspects of the present disclosure may enter power save mode without performing serving and neighbor cells measurements which may lead to reduced power consumption and extended battery life. According to an aspect of the present disclosure, when the SCD enters the CNMBOS mode, the SCD may turn off the RF and baseband receiver of the cellular modem when it need not perform measurements and may enter a power save state. This may be a significant advantage for deeply embedded SCDs powered with limited capacity batteries. For the case where the PCD and SCDs are camped on the same cell of the same frequency and the same RAT type, the PCD need not do any additional serving and neighbor cell measurements beyond what it may normally do for its own WWAN modem. This may be the most common case when the PCD and SCDs have the service from the WWAN with the same PLMN.

Figure 11:
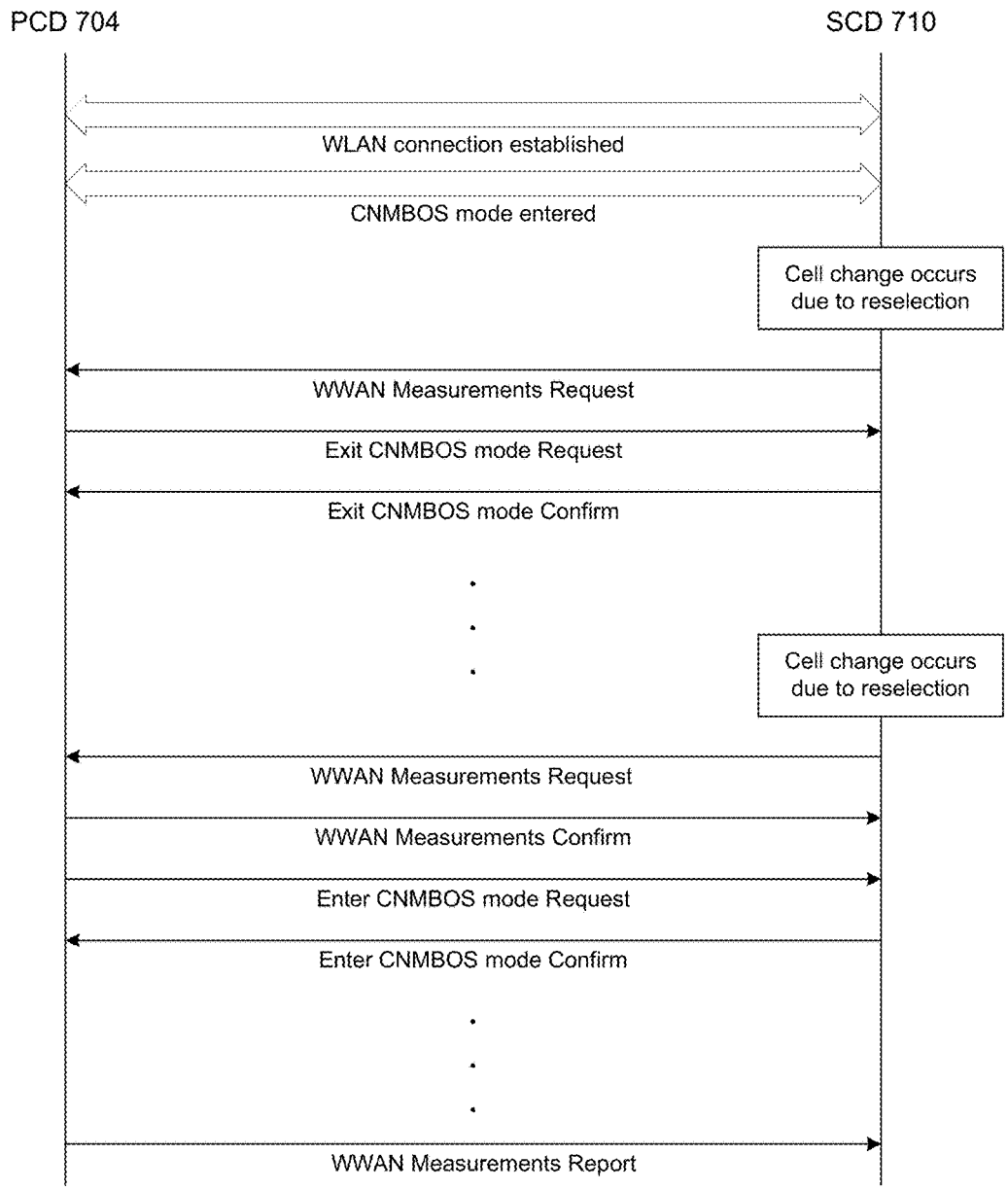
FIG. 11 illustrates an MSC for an example scenario for the handling of cell reselection by an SCD leading to the exit from CNMBOS mode followed by another reselection leading to entering of CNMBOS mode according to the aspects of the present disclosure.

According to an aspect of the present disclosure, when the PCD and the SCDs are in CNMBOS mode and if a cell change occurs in either PCD or in one or more of the SCDs and if the PCD may not be able to continue the CNMBOS mode with one or more of the SCDs then the PCD may send "Exit CNMBOS mode Request" to one or more of the SCDs and may exit the CNMBOS mode with those SCDs. An example of this type of scenario is illustrated in FIG. 11 where initially the PCD 704 and the SCD Smartphone 710 are in CNMBOS mode. At some point the SCD Smartphone 710 may perform cell reselection and to ensure that the CNMBOS mode can be continued, it may send the "WWAN Measurements Request" message to the PCD to update its list of cells on which to make measurements. The PCD 704 may determine that it may not be able to support the CNMBOS mode for the SCD Smartphone 710 for the newly provided list of cells. Therefore, the PCD 704 may send the "Exit CNMBOS mode Request" message to the SCD Smartphone 710 which may accept the request and send the "Exit CNMBOS mode Confirm" message to the PCD. From this point in time, the SCD Smartphone 710 may begin performing neighbor cell measurements on its own. At further later point in time, the SCD Smartphone 710 may perform another cell reselection and to determine the CNMBOS mode can be entered, it may send the "WWAN Measurements Request" message to the PCD 704 to update the list of neighbor cells on which to make measurements. The PCD 704 may determine that it may be able to support the CNMBOS mode for the SCD Smartphone 710 for the newly provided list of neighbor cells. Therefore, the PCD 704 may send the "WWAN Measurements Confirm" message to the SCD Smartphone 710. Then, the PCD 704 may send the "Enter CNMBOS mode Request" message to the SCD Smartphone 710 which may accept the request and send the "Enter CNMBOS mode Response" message to the PCD. From this point forward, the PCD 704 may start performing measurements on the list of cells provided by the SCD Smartphone 710.

Figure 12:
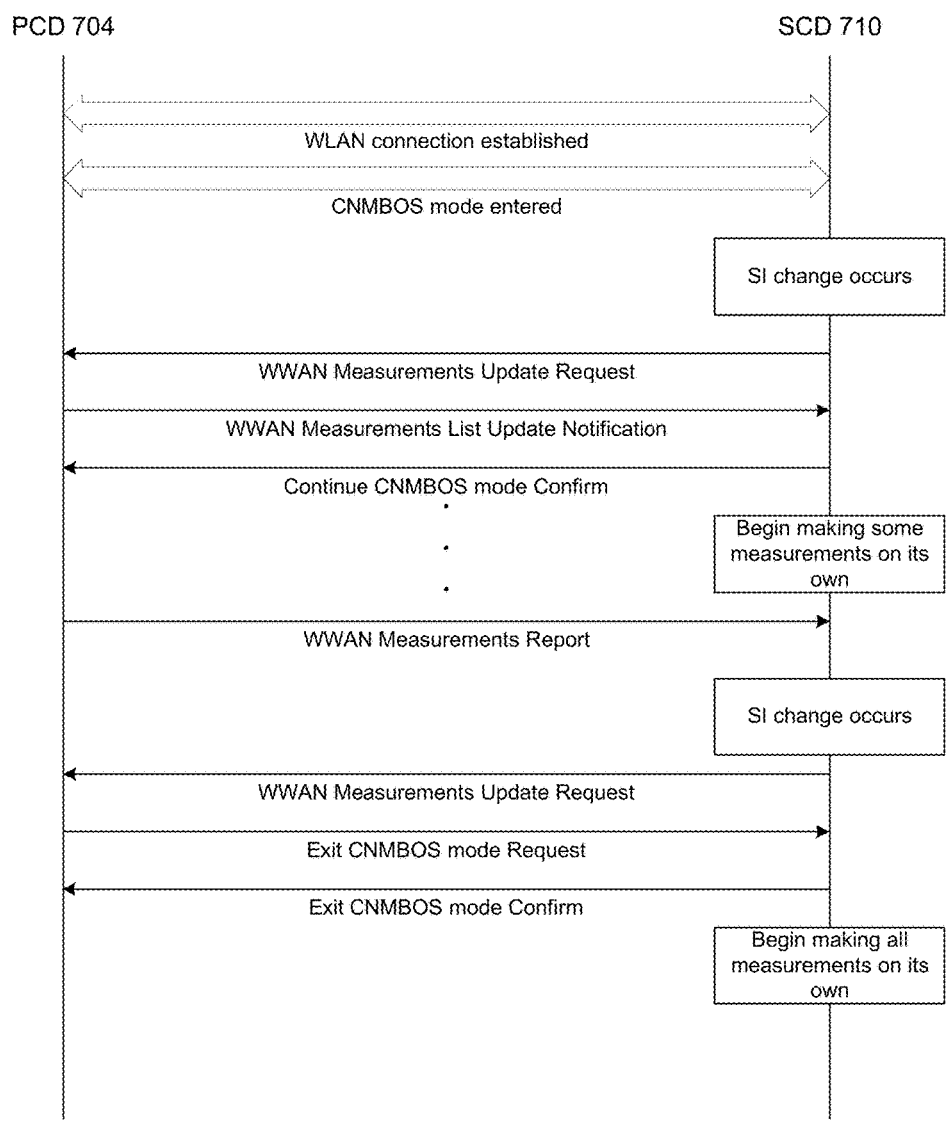
FIG. 12 illustrates an MSC for an example scenario for the handling of System Information (SI) change of the cell camped on by an SCD, leading to partial measurements by PCD and partial measurements by the SCD and eventual exit from CNMBOS mode according to the aspects of the present disclosure.

The SI of the cell on which the SCD is camped may change which in turn may change the list of neighbor cells for which the SCD may need to perform the measurements. When the SCD detects the change in the list of neighbor cells on which to perform the measurements, the SCD may send "WWAN Measurements Update Request" message to the PCD which in turn may lead to a change in the scheduling of various measurements at the PCD. According to an aspect of the present disclosure, when the PCD and the SCDs are in CNMBOS mode and if there is a change in the list of neighbor cells for which the SCD expects the PCD to perform the measurements and if the PCD determines that it may be able to accommodate the new list of neighbor cells by performing the measurements on one or more, including all, of the cells included in the updated list provided by the SCD, the PCD may send the "WWAN Measurements List Update Notification" message to communicate to the SCD about the list of cells on which the PCD may be able to make measurements. According to an aspect of the present disclosure, if the PCD can make measurements on at least one of the cells from the updated list of neighbor cells provided by the SCD, then the SCD may send a positive acknowledgement using the "Continue CNMBOS mode Confirm" message to the PCD as illustrated in FIG. 12. According to an aspect of the present disclosure, upon reception of the acknowledgment from the SCD, both the SCD and the PCD may continue the CNMBOS mode. According to an aspect of the present disclosure, the PCD may determine that it may be unable to perform measurements on any of the cells in the updated neighbor cell list provided by the SCD and it may deny the measurements request entirely by sending a negative acknowledgment to the SCD. According to an aspect of the present disclosure, when the PCD and the SCDs are in CNMBOS mode and if there is a change in the list of neighbor cells for which the SCD expects the PCD to perform the measurements and if the PCD may not be able to continue the CNMBOS mode with one or more of the SCDs, then in this case, the PCD may send "Exit CNMBOS mode Request" to one or more of the SCDs which may send the "Exit CNMBOS mode Confirm" and may exit the CNMBOS mode with those SCDs as illustrated in FIG. 12.

Figure 13:
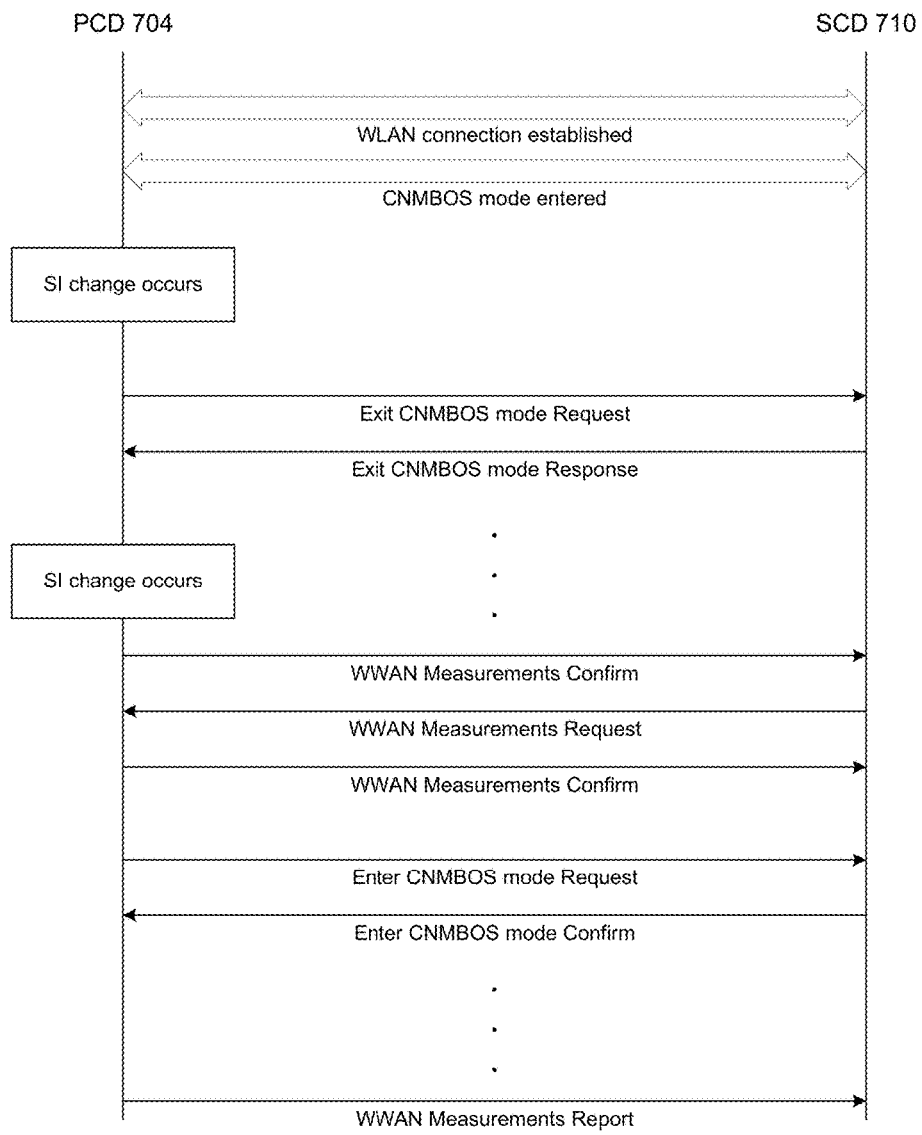
FIG. 13 illustrates an MSC for an example scenario for the handling of SI change of the cell camped on by the PCD leading to exit from CNMBOS mode followed by another reselection leading to entry in to CNMBOS mode according to the aspects of the present disclosure.

The SI of the cell on which the PCD is camped may change which in turn may lead to change in the scheduling of various measurements at the PCD. This in turn may impact whether the PCD can continue to be in CNMBOS mode and make measurements on neighbor cells for the SCDs. According to an aspect of the present disclosure, when the PCD and the SCDs are in CNMBOS mode and if there is a change in the SI for the PCD serving cell or PCD performs cell reselection, the PCD may not be able to continue the CNMBOS mode with one or more of the SCDs. In this case, the PCD may send "Exit CNMBOS mode Request" to one or more of the SCDs and may exit the CNMBOS mode with those SCDs. An example MSC for handling this type of scenario is illustrated in FIG. 13 where initially the PCD 704 and the SCD Smartphone 710 are in CNMBOS mode. At some point in time, the SI of the camped on cell of the SCD Smartphone 710 may be updated by the WWAN. The PCD 704 may determine that it may not be able to support the CNMBOS mode for the SCD Smartphone 710 for the newly updated SI. Therefore, the PCD 704 may send the "Exit CNMBOS mode Request" message to the SCD Smartphone 710 which may accept the request and send the "Exit CNMBOS mode Confirm" message to the PCD 704. At further later point in time, the SI of the camped on cell of the PCD 704 may be updated by the network and the PCD may send the "WWAN Measurements Confirm" message to the SCD to indicate that the PCD 704 may now be able to resume neighbor cell measurements for the SCD. The SCD Smartphone 710 may send the "WWAN Measurements Request" with the updated list of cells on which measurements need to be done. The PCD 704 may determine that it may be able to support the CNMBOS mode for the SCD Smartphone 710 for the newly updated list of neighbor cells. Therefore, the PCD 704 may send the "WWAN Measurements Confirm" message followed by the "Enter CNMBOS mode Request" message to the SCD Smartphone 710 which may accept the request and send the "Enter CNMBOS mode Response" message to the PCD 704. From this point forward, the PCD 704 may continue to start performing measurements on the list of cells provided by the SCD Smartphone 710.

Figure 14:
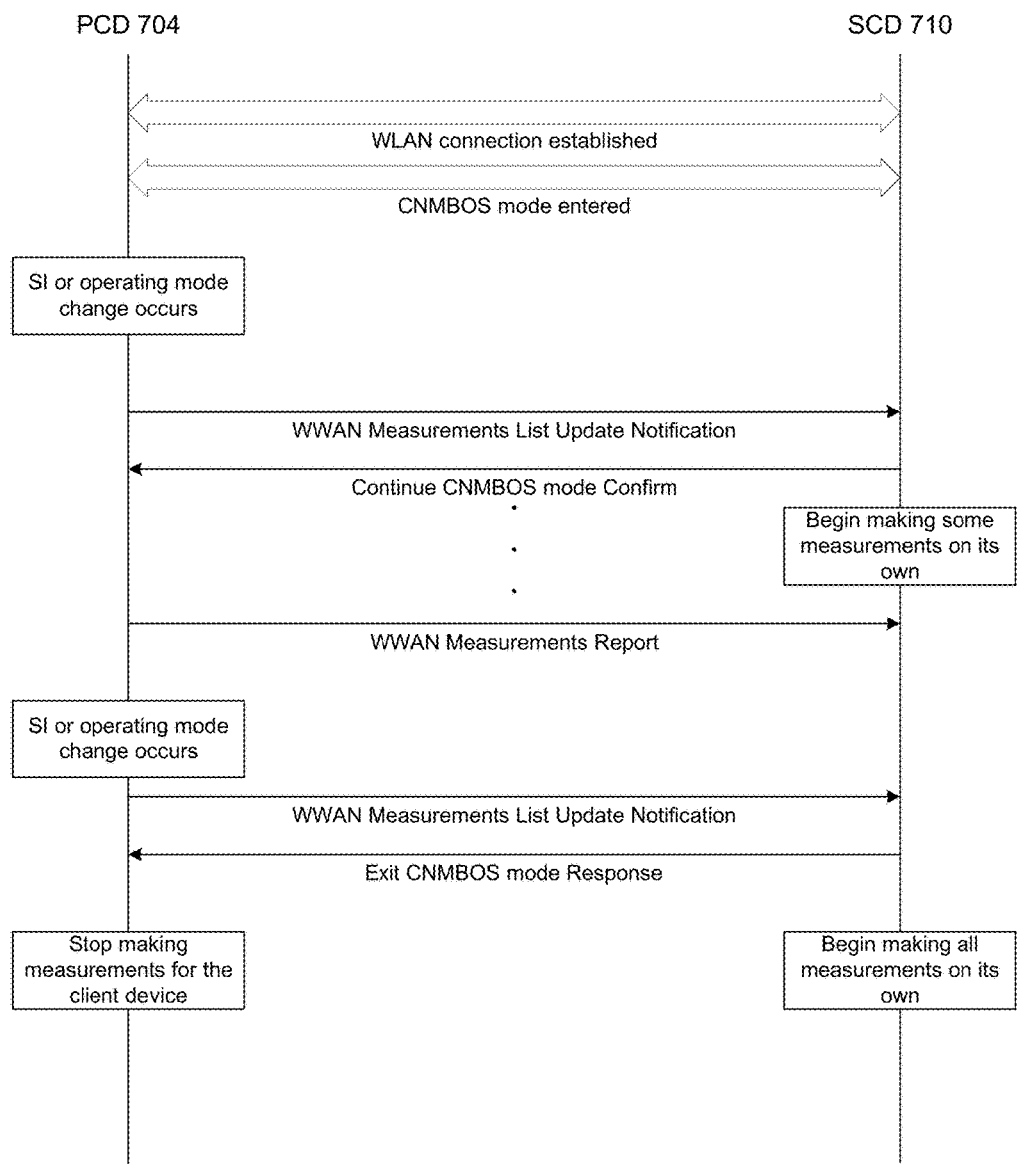
FIG. 14 illustrates an MSC for an example scenario for the handling of operating mode change by the PCD, leading to partial measurements by PCD and partial measurements by the client device and eventual exit from CNMBOS mode according to the aspects of the present disclosure.

According to an aspect of the present disclosure, at any point of time, because of a change in the operating mode of the PCD, the PCD may determine that it may not be able to continue to support some of the neighbor cell measurements that were previously communicated to the SCD. An operating mode change may include, for example, transition from active connection to idle mode. In such a scenario the PCD may send the "WWAN Measurements List Update Notification" message to the SCD with the updated neighbor cell list for which the PCD may continue to support the measurements for the SCD. According to an aspect of the present disclosure, upon receiving the "WWAN Measurements List Update Notification" from the PCD, the SCD may send "Continue CNMBOS mode Confirm" message to the PCD to continue in the CNMBOS mode and the SCD may perform the measurements for the neighbor cell on its own for the neighbor cells that are removed from the list by the PCD as illustrated in FIG. 14. According to another aspect of the present disclosure upon receiving the "WWAN Measurements List Update Notification" from the PCD, if the SCD determines that that PCD updated neighbor cell list measurements may not be serving the purpose of the CNMBOS mode then the SCD may decide to exit the CNMBOS mode with the PCD and may send the "Exit CNMBOS mode Confirm" message to the PCD that it is exiting the CNMBOS mode and the SCD may start performing the neighbor cell measurements on its own as illustrated in FIG. 14.

According to an aspect of the present disclosure, a PCD may perform SI monitoring and updating the SCDs as described in U.S. application Ser. No. 15/351,999 filed Nov. 15, 2016 and Ser. No. 15/352,097, filed Nov. 15, 2016, incorporated by reference herein. Upon reception of an updated SI, the SCD may determine that the list of neighbor cells on which the measurements need to be performed is updated and may communicate the updated list of neighbor cells to the PCD as illustrated in FIG. 14 to determine whether the CNMBOS mode can be continued for the updated list of neighbor cells. The remaining processing remains similar to the case where the SI reception directly from WWAN may be performed by the SCD.

Since the locations of an SCD and the PCD may be different, the values of the various measurements such as RSSI, RSRP, RSRQ, etc. for a particular cell may be different for an SCD and the PCD. Because of this, when using the measurements reports from the PCD for making cell reselection and handover decisions, an SCD may make a different decision compared to the case when using the measurements performed by itself. According to an aspect of the present disclosure, to ensure correct cell reselection and handover decisions, an SCD may perform estimation and compensation for the differences in the measurements made by the SCD and the PCD. Different methods may be used for the estimation and compensation of the differences in measurements between an SCD and the PCD and one such method is described next. According to an aspect of the present disclosure, to compensate for the differences in measurement values with the PCD, an SCD may continue to perform its own measurements even after entering the CNMBOS mode. According to an aspect of the present disclosure, after receiving a configurable number of "WWAN Measurements Report" messages in CNMBOS mode, the SCD may compare its own measurements against the average of the values received in the "WWAN Measurements Report" for each cell and estimate a compensation value for each metric. For example, for one cell, the measured RSSI may be higher by $\Delta_1$ dB for the PCD compared to the RSSI measured by the SCD for the same cell. For example, for another cell, the measured RSSI may be lower by $\Delta_2$ dB for the PCD compared to the RSSI measured by the SCD for the same cell. According to an aspect of the present disclosure, after establishing the compensation values for each metric for each cell, the SCD may stop performing its own measurements and start using the measurements reports from the PCD in combination with the established compensation values to make cell reselection and handover decisions. According to an aspect of the present disclosure, an SCD may periodically update the established compensation values by performing measurements by itself. For example, an SCD may make its own measurements once every 10 minutes to update the compensation values.

According to an aspect of the present disclosure, a PCD may perform SI monitoring and updating as described in U.S. application Ser. No. 15/351,999 filed Nov. 15, 2016 and Ser. No. 15/352,097, filed Nov. 15, 2016, incorporated by reference herein, in combination with performing serving and neighbor cells measurements as per the aspect of the present disclosure. According to an aspect of the present disclosure, the redundant steps performed as described in U.S. application Ser. No. 15/351,999 filed Nov. 15, 2016 and Ser. No. 15/352,097, filed Nov. 15, 2016 and the present disclosure may be eliminated.

Although the term SRWL is used herein to describe the various aspects of the present disclosure, the disclosure may be applicable to any SCD that may be using a WWAN and the short range connectivity link may not necessarily be wireless and the SCD may not necessarily be mobile. For example, the PCD and the SCDs may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the SCDs may be connected to the PCD over Ethernet for internet connection but may continue to use the WWAN for other services. In this case the PCD may use its own WWAN modem to decode the SI of the cell on which the SCD is camped on and provide any updated SIs to the SCDs over the Ethernet. In another example, an SCD may be connected to a Personal Computer (PC) that has a built-in WWAN modem. The SCD may be connected to the PC over a USB cable for charging and/or transferring music, images, videos, etc. between the PC and the SCD. In this case, the PC may be in the equivalent role of a PCD. The PC may use its WWAN modem to decode the SI of the cell on which the SCD is camped and provide any updated SIs to the SCDs over the USB cable.

The invention claimed is:

1. A method of collaborative communication of measurement information in a communication network, in which a Short Range Wireless Links (SRWL) is established between a first client device and a plurality of second client devices, the method comprising:
controlling, by a processing device, at the first client device,
receiving, over the SRWL, a broadcast Primary Client Device (PCD) Request message transmitted from a third client device of the second client devices;
transmitting, over the SRWL, a PCD Accept message to the third client device, based on a determination at the first client device to receive measurement information on a serving cell and neighbor cells of the serving cell which are of a Wireless Wide Area Network (WWAN) through the third client device; and
receiving, over the SRWL, from the third client device a PCD Confirm message indicating designation of the third client device as a PCD for the first client device, in which the first client device is a secondary client device (SCD) of the third client device.

2. The method of claim 1, further comprising:
controlling, by the processing device, at the first client device, receiving the measurement information over the SRWL.

3. The method of claim 1, further comprising:
controlling, by the processing device, at the first client device, when a second broadcast PCD Request message is received over the SRWL from a fourth client device of the second client devices,
transmitting, over the SRWL, a second PCD Accept message to the fourth client device, based on a determination at the first client device to receive second measurement information on a second serving cell and second neighbor cells of the second serving cell through the fourth client device, such that the first client device is a SCD of the fourth client device which is another PCD of the first client device.

4. The method of claim 3, further comprising:
controlling, by the processing device, at the first client device, receiving the measurement information and the second measurement information over the SRWL.

5. The method of claim 1, further comprising:
controlling, by the processing device, at the first client device, when a second broadcast PCD Request message is received over the SRWL from a fourth client device of the second client devices,
receiving, from the fourth client device over the SRWL, a PCD Revoke message, in which the fourth client device, by sending the PCD Revoke message, accepts the third client device as the PCD for the third client device.

6. The method of claim 3, further comprising:
controlling, by the processing device, at the first client device, estimating composite measurement information from the first and second measurement information.

7. The method of claim 6, in which the composite information is determined by filtering or averaging the first and second measurement information for same cells.

8. The method of claim 6, in which a serving cell of the third client device is same as a serving cell of the fourth client device.

9. The method of claim 3, further comprising:
controlling, by the processing device, at the first client device, when the first client device as the SCD moves away from a coverage area of one of the third client device and the fourth client device, continuing to receive given measurement information from the other of the third client device and the fourth client device.

10. The method of claim 3, further comprising:
controlling, by the processing device, at the first client device, when one of the third client device and the fourth client device moves away from a coverage area of the SCD, continuing to receive given measurement information from the other of the third client device and the fourth client device.

11. The method of claim 1, further comprising
controlling, by the processing device, at the first client device, when a PCD Revoke message is received over the SRWL from the third client device,
determining whether another PCD of the first client device is remaining on the SRWL;
when the another PCD is determined to be remaining on the SRWL, continuing to receive another measurement information of another serving cell and neighbor cells of the another serving cell from the another PCD; and
when no PCD is determined to be remaining on the SRWL, resuming measurement of a serving cell for the SCD and neighbor cells for the SCD serving cell at the SCD and transmitting, over the SRWL, a PCD Request message indicating the first client device desires to become a PCD.

12. The method of claim 3,
wherein the PCD Request and the second PCD Request messages transmitted over the SRWL respectively from the third client device and the fourth client device include received signal metrics, and
the method further comprising:
controlling, by the processing device, at the first client device,
comparing the received signal metrics from the third and fourth client devices and selecting as a preferred PCD a selected client device of the third and fourth client devices determined to have a best received signal metric.

13. The method of claim 12,
wherein the received signal metric includes at least one of a Received Signal Strength Indicator (RSSI), Reference Signal Received Power (RSRP), Reference Signal Received Quality (RSRP) or Signal to Interference Noise Ratio (SINR).

14. The method of claim 1, further comprising:
controlling, by the processing device, at the first client device, requesting, over the SRWL, the PCD to perform measurements on at least one of a serving cell of the SCD or neighbor cells of the SCD serving cell.

15. The method of claim 14, wherein the requesting to perform the measurements includes transmitting a list of intra-frequency, inter-frequency, and inter-Radio Access Technology (RAT) cells on which the PCD is requested to perform the measurements.

16. The method of claim 14, wherein the requesting to perform the measurements is by specifying only a Radio Access Technology (RAT) type and frequency band for which the PCD is requested to perform neighbor cell measurements.

17. The method of claim 14, further comprising:
controlling, by a processing device, at the first client device client device, when a measurements report is received from the PCD indicating measurements performed on cells of a cell list determined from a second cell list of second cells included in a request for PCD measurement from the SCD,
    performing cell detection on a cell, $C_n$, of the cell list;
    after detecting the cell $C_n$, synchronizing to the cell $C_n$ for cell reselection or cell selection; and
    after synchronizing to the cell $C_n$, mapping Relative Time Offsets (RTOs) of neighbor cells from the measurement report respectively to second RTOs relative to the cell $C_n$.

18. The method of claim 1, further comprising:
controlling, by the processing device, at the first client device, when the SCD is out of a coverage area such that the SRWL with the PCD is not maintainable or the SCD is disconnected from the PCD, exiting a Cellular Neighbor Measurement Broadcast over SRWL (CNMBOS) mode with the PCD and starting neighbor cell measurements according to a predetermined Radio Access Technology (RAT) type specific measurement procedure.

19. The method of claim 1, further comprising:
controlling, by the processing device, at the first client device, when the SCD is disconnected from the PCD, exiting a Cellular Neighbor Measurement Broadcast over SRWL (CNMBOS) mode with the PCD and starting neighbor cell measurements according to a predetermined Radio Access Technology (RAT) type specific measurement procedure.

20. The method of claim 1, wherein the SCD is preconfigured with at least one Radio Access Technology (RAT) type, frequency or cells for which the SCD is to perform neighbor cell measurements.

21. The method of claim 1, further comprising:
controlling, by the processing device, at the first client device, when the SCD is disconnected from the PCD or not able to find another PCD in a vicinity of the SCD, starting neighbor cell measurements on given cells of the WWAN.

22. The method of claim 1, further comprising:
controlling, by the processing device, at the first client device, transmitting over the SRWL to the PCD a request to perform neighbor cell measurements, when the SCD is in idle mode or active communication with the WWAN.

23. The method of claim 1, further comprising:
controlling, by the processing device, at the client device, when the SCD is disconnected from the PCD and not able to find another PCD for a current location of the SCD, starting performing cell measurements at the SCD.

24. The method of claim 1, further comprising:
controlling, by the processing device, at the first client device, when the first client device enters a Cellular Neighbor Measurement Broadcast over SRWL (CNMBOS) mode with the PCD and measurements on a serving cell of the SCD and neighbor cells of the SCD serving cell do not need to be performed at the SCD, turning off a Radio Frequency (RF) receiver and baseband receiver of a cellular modem of the first client device and entering a power save state.

25. The method of claim 1, further comprising:
controlling, by the processing device, at the first client device,
    transmitting, over the SRWL, a first neighbor cell list indicating first cells for which the PCD is expected to perform measurements;
    receiving, over the SRWL from the PCD, a WWAN Measurements List Update Notification message with an updated neighbor cell list indicating at least one given cell for which the PCD can continue to support neighbor cell measurement for the SCD, in which at least one removed cell of the first cells is not on the updated neighbor cell list;
    transmitting, over the SRWL, to the PCD a Continue CNMBOS mode Confirm message indicating continuation of a Cellular Neighbor Measurement Broadcast over SRWL (CNMBOS) mode with the PCD; and
    performing measurements for the at least one removed cell.

26. The method of claim 1, further comprising:
controlling, by the processing device, at the first client device,
    transmitting, over the SRWL, a first neighbor cell list indicating first cells for which the PCD is expected to perform measurements;
    receiving, over the SRWL from the PCD, a WWAN Measurements List Update Notification message with an updated neighbor cell list indicating at least one given cell for which the PCD can continue to support neighbor cell measurement for the SCD, in which at least one removed cell of the first cells is not on the updated neighbor cell list; and
    when a determination is that measurements for the updated neighbor cell list do not satisfy criteria for continuing in a Cellular Neighbor Measurement Broadcast over SRWL (CNMBOS) mode with the PCD, exiting the CNMBOS mode with the PCD, transmitting over the SRWL an Exit CNMBOS mode Confirm message to the PCD and starting performing neighbor cell measurements.

27. The method of claim 1, further comprising:
controlling, by the processing device, at the first client device,
    transmitting, over the SRWL, a first neighbor cell list indicating first cells for which the PCD is expected to perform measurements;
    receiving, over the SRWL from the PCD, updated system information (SI) indicating a change in the SI for a serving cell of the PCD and neighbor cells for the PCD serving cell;
    based on the updated SI, determining an updated neighbor cell list; and
    transmitting, over the SRWL to the PCD, the updated neighbor cell list.

28. The method of claim 1, further comprising:
controlling, by the processing device, at the first client device, when the SCD is in a Cellular Neighbor Measurement Broadcast over SRWL (CNMBOS) mode with the PCD and, based on an estimation, differences are determined between measurements performed by the SCD and measurements performed by the PCD, compensating for the differences in the measurements respectively by the SCD and the PCD, by at least one of
(i) continuing to perform cell measurements, after entering the CNMBOS mode with the PCD, or
(ii) when a predetermined number of WWAN Measurements Report messages are received while the SCD is in the CNMBOS mode,
  comparing the measurements of the SCD against an average of values received in a WWAN Measurements Report for each cell indicated in the measurements performed by the PCD and estimating a compensation value for each measurement metric, and
  when the compensation value is estimated for each measurement metric for each cell indicated in the measurements performed by the PCD, stopping performing measurements at the SCD and starting to use the measurements reports from the PCD in combination with the compensation values to make a cell reselection and handover decision.

29. The method of claim 28, further comprising:
controlling, by the processing device, at the first client device, periodically updating the compensation values by performing additional measurements at the SCD.

30. An apparatus for collaborative communication of measurement information in a communication network, in which a Short Range Wireless Links (SRWL) is established between a first client device and a plurality of second client devices, the apparatus comprising:
  circuitry configured to control, at the first client device,
    receiving, over the SRWL, a broadcast Primary Client Device (PCD) Request message transmitted from a third client device of the second client devices;
    transmitting, over the SRWL, a PCD Accept message to the third client device, based on a determination at the first client device to receive measurement information on a serving cell and neighbor cells of the serving cell which are of a Wireless Wide Area Network (WWAN) through the third client device; and
    receiving, over the SRWL, from the third client device a PCD Confirm message indicating designation of the third client device as a PCD for the first client device, in which the first client device is a secondary client device (SCD) of the third client device.

31. A wireless communication device comprising:
a receiver to receive a wireless communication; and
a processing device configured for collaborative communication of measurement information in a communication network, in which a Short Range Wireless Links (SRWL) is established between the wireless communication device and a plurality of second client devices,
wherein the processing device is configured to control
  receiving, over the SRWL, a broadcast Primary Client Device (PCD) Request message transmitted from a third client device of the second client devices;
  transmitting, over the SRWL, a PCD Accept message to the third client device, based on a determination at the wireless communication device to receive measurement information on a serving cell and neighbor cells of the serving cell which are of a Wireless Wide Area Network (WWAN) through the third client device; and
  receiving, over the SRWL, from the third client device a PCD Confirm message indicating designation of the third client device as a PCD for the wireless communication device, in which the wireless communication device is a secondary client device (SCD) of the third client device.

* * * * *